United States Patent
Kato

(10) Patent No.: US 10,493,561 B2
(45) Date of Patent: Dec. 3, 2019

(54) LASER MACHINING DEVICE PROVIDED WITH LASER EMITTER EMITTING LASER BEAM AND MACHINING CHAMBER

(71) Applicant: BROTHER KOGYO KABUSHIKI KAISHA, Nagoya, Aichi (JP)

(72) Inventor: Yasuhiro Kato, Nagoya (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 316 days.

(21) Appl. No.: 15/474,181

(22) Filed: Mar. 30, 2017

(65) Prior Publication Data

US 2017/0203390 A1  Jul. 20, 2017

Related U.S. Application Data

(63) Continuation of application No. PCT/JP2015/085773, filed on Dec. 22, 2015.

(30) Foreign Application Priority Data

Dec. 26, 2014  (JP) .................................. 2014-263844

(51) Int. Cl.
  *B23K 26/00* (2014.01)
  *B23K 26/04* (2014.01)
  *B23K 26/082* (2014.01)
  *B23K 26/70* (2014.01)
  (Continued)

(52) U.S. Cl.
  CPC ........ *B23K 26/082* (2015.10); *B23K 26/0006* (2013.01); *B23K 26/127* (2013.01);
  (Continued)

(58) Field of Classification Search
  CPC .............. B23K 26/0006; B23K 26/082; B23K 26/127; B23K 26/352; B23K 26/355;
  (Continued)

(56) References Cited

U.S. PATENT DOCUMENTS

| 5,719,372 A * | 2/1998 | Togari ................ B23K 26/0622 219/121.61 |
| 2004/0009618 A1* | 1/2004 | Couch .................... B23K 26/03 438/13 |

(Continued)

FOREIGN PATENT DOCUMENTS

| JP | S59-44678 U | 3/1984 |
| JP | S62-252690 A | 11/1987 |

(Continued)

OTHER PUBLICATIONS

International Search Report issued in the corresponding international patent application No. PCT/JP2015/085773 dated Feb. 23, 2016.

(Continued)

*Primary Examiner* — Sang Y Paik
(74) *Attorney, Agent, or Firm* — K&L Gates LLP

(57) ABSTRACT

In a laser machining device, a laser emitter is inhibited from emitting a laser beam in a stop state, and can emit the laser beam in a machining state. A controller is configured to perform: in response to detecting opening of a door of a machining chamber, bringing the laser emitter into the stop state and disabling receipt of a release command via an interface; in response to detecting closing of the door while the laser emitter is in the stop state, determining whether the laser emitter is in the machining state when the opening of the door is detected; in response to determining that the laser emitter is not in the machining state, releasing the stop state of the laser emitter; and in response to determining that the laser emitter is in the machining state, enabling the receipt of the release command via the interface.

6 Claims, 11 Drawing Sheets

(51) Int. Cl.
*B41M 5/24* (2006.01)
*B23K 26/12* (2014.01)
*B23K 26/352* (2014.01)
*B41M 5/26* (2006.01)

(52) U.S. Cl.
CPC .......... *B23K 26/352* (2015.10); *B23K 26/355* (2018.08); *B23K 26/70* (2015.10); *B23K 26/702* (2015.10); *B41M 5/24* (2013.01); *B41M 5/26* (2013.01)

(58) Field of Classification Search
CPC ........ B23K 26/70; B23K 26/702; B41M 5/24; B41M 5/26
USPC .......................................... 219/121.6–121.86
See application file for complete search history.

(56) References Cited

U.S. PATENT DOCUMENTS

| | | | |
|---|---|---|---|
| 2009/0271025 | A1 | 10/2009 | Brauchle |
| 2013/0146568 | A1* | 6/2013 | Moffitt ................. H01L 21/428 219/121.61 |
| 2014/0263201 | A1* | 9/2014 | Unrath ................. B23K 26/082 219/121.8 |

FOREIGN PATENT DOCUMENTS

| | | |
|---|---|---|
| JP | H05-285680 A | 11/1993 |
| JP | H11-47950 A | 2/1999 |
| JP | H11-309590 A | 11/1999 |
| JP | 2003-145284 A | 5/2003 |
| JP | 2009-536580 A | 10/2009 |
| JP | 2012-148315 A | 8/2012 |
| WO | 2014/165281 A1 | 10/2014 |

OTHER PUBLICATIONS

Written Opinion of International Search Authority issued in the corresponding international patent application No. PCT/JP2015/085773 dated Feb. 23, 2016.

English translation of International Preliminary Report on Patentability dated Jun. 27, 2017 issued in the corresponding international patent application No. PCT/JP2015/085773.

* cited by examiner

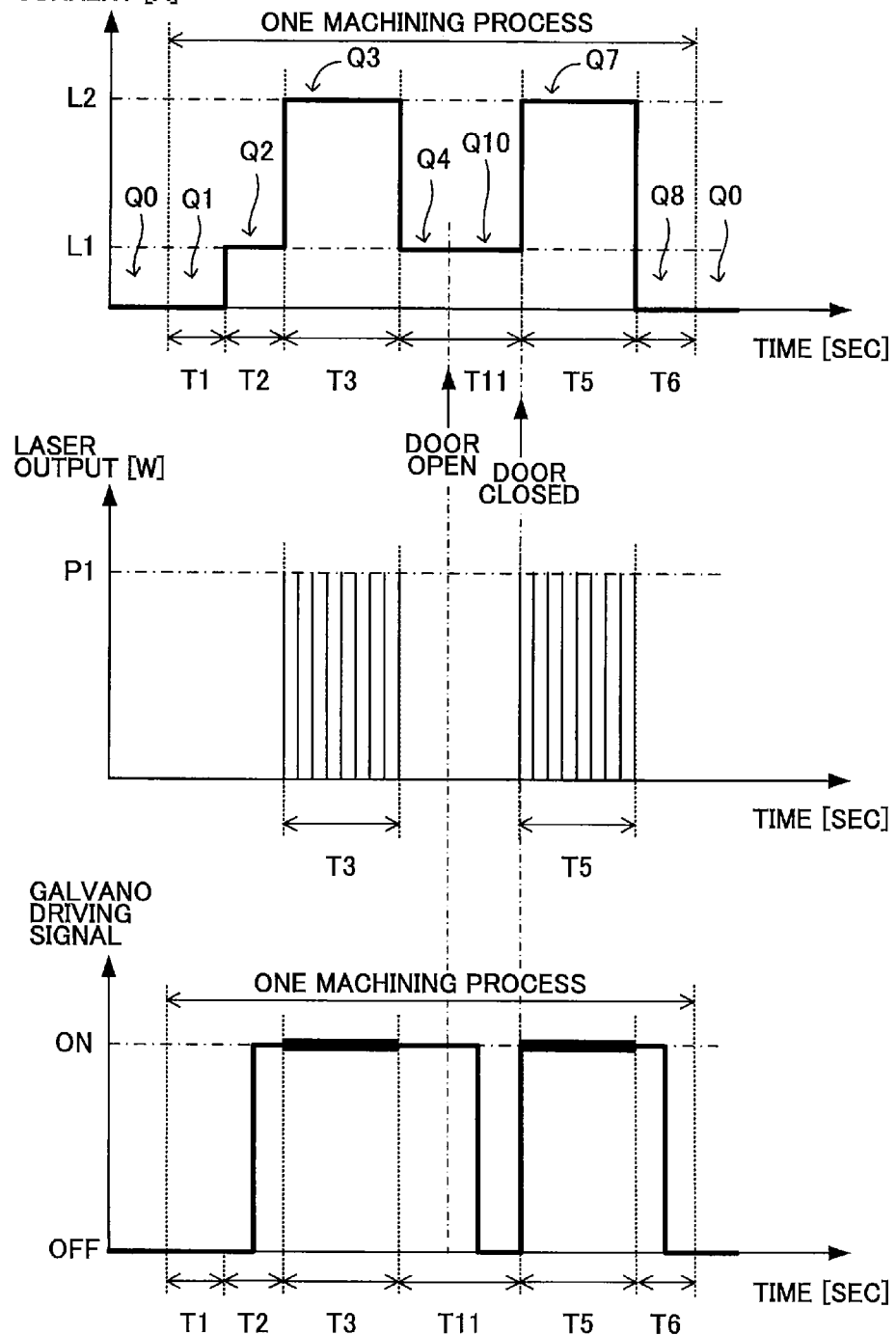

LASER MACHINING DEVICE PROVIDED WITH LASER EMITTER EMITTING LASER BEAM AND MACHINING CHAMBER

CROSS REFERENCE TO RELATED APPLICATION

This application is a continuation application of International Application No. PCT/JP2015/085773 filed on Dec. 22, 2015 in the Japan Patent Office acting as Receiving Office, claiming priority from Japanese Patent Application No. 2014-263844 filed on Dec. 26, 2014. The entire contents of each of these applications are incorporated herein by reference.

TECHNICAL FIELD

The present disclosure relates to a laser machining device and a method of controlling laser machining with the laser machining device.

BACKGROUND

Conventionally, various techniques related to laser machining devices are suggested.

For example, Japanese Patent Application Publication No. 2012-148315 discloses a laser machining device that includes a laser marker for performing machining a work by irradiating a laser beam onto the work, and a terminal device for editing its machining contents. The laser marker has a marker head that emits and scans the laser beam, and a marker controller that controls the operation of the marker head. Further, the marker controller is provided with a terminal base connected with an urgent stop button, and a power switch for laser output.

When an urgent stop signal for inhibiting the laser marker from emitting the laser beam onto the work is inputted via the terminal base upon operation on the urgent stop button, the laser machining device is brought into an urgent stop state in which irradiation of the laser beam onto the work is inhibited. In order to release the urgent stop state, a user once turns the power switch for laser output off and again turns the same on.

SUMMARY

However, the above-described laser machining device is brought into the urgent stop state even when the urgent stop signal is inputted while the laser beam is not emitted, for example, while moving a galvano mirror from an end position of the irradiation to a start position of the next irradiation during printing of symbols such as a character, a graphic, a mark, and the like, that is, during the machining. Thus, the user should once turn the power switch for laser output off and again turn the same on to release the urgent stop state even though the laser beam is not emitted, thereby making the release operation of the urgent stop state cumbersome and complicated. In addition, it requires time to emit the laser beam again, thereby taking longer time to perform the machining.

In view of the foregoing, it is an object of the disclosure to provide a laser machining device and a method of controlling laser machining with the laser machining device capable of reducing time required for machining by automatically releasing an urgent stop state when the laser machining device is brought into the urgent stop state while a laser beam is not emitted.

In order to attain the above and other objects, the present disclosure provides a laser machining device that includes: a laser head; a machining chamber; a detector; a driver; an interface; and a controller. The laser head includes: a laser emitter; and a scanner. The laser emitter is configured to emit a laser beam. The scanner is configured to scan the laser beam onto a workpiece. The laser emitter performs machining the workpiece by the laser beam in a machining state. The machining chamber supports the laser head. The machining chamber has a door. The workpiece is disposed in the machining chamber. The detector is configured to detect opening and closing of the door. The driver is configured to drive the laser emitter and the scanner. The interface is configured to receive a release command instructing to release a stop state of the laser emitter. The laser emitter is inhibited from emitting the laser beam in the stop state. The controller is configured to perform: (a) in the machining state, controlling the laser emitter and the scanner via the driver according to machining data; (b) in response to detecting the opening of the door, bringing the laser emitter into the stop state and disabling receipt of the release command via the interface; (c) in response to detecting the closing of the door while the laser emitter is in the stop state, determining whether the laser emitter is in the machining state when the opening of the door is detected; (d) in response to determining that the laser emitter is not in the machining state, releasing the stop state of the laser emitter; (e) in response to determining that the laser emitter is in the machining state, enabling the receipt of the release command via the interface; and (f) in response to receiving the release command via the interface, releasing the stop state of the laser emitter.

According to another aspect, the present disclosure provides a method of controlling laser machining with a laser machining device. The laser machining device includes: a laser head; a machining chamber; a detector; a driver; and an interface. The laser head includes: a laser emitter; and a scanner. The laser emitter is configured to emit a laser beam. The scanner is configured to scan the laser beam onto a workpiece. The laser emitter performs machining the workpiece by the laser beam in a machining state. The machining chamber supports the laser head. The machining chamber has a door. The workpiece is disposed in the machining chamber. The detector is configured to detect opening and closing of the door. The driver is configured to drive the laser emitter and the scanner. The interface is configured to receive a release command instructing to release a stop state of the laser emitter. The laser emitter is inhibited from emitting the laser beam in the stop state. The method includes: (a) in the machining state, controlling the laser emitter and the scanner via the driver according to machining data; (b) in response to detecting the opening of the door, bringing the laser emitter into the stop state and disabling receipt of the release command via the interface; (c) in response to detecting the closing of the door while the laser emitter is in the stop state, determining whether the laser emitter is in the machining state when the opening of the door is detected; (d) in response to determining that the laser emitter is not in the machining state, releasing the stop state of the laser emitter; (e) in response to determining that the laser emitter is in the machining state, enabling the receipt of the release command via the interface; and (f) in response to receiving the release command via the interface, releasing the stop state of the laser emitter.

BRIEF DESCRIPTION OF THE DRAWINGS

The particular features and advantages of the disclosure as well as other objects will become apparent from the following description taken in connection with the accompanying drawings, in which:

FIG. 11 is an explanatory diagram illustrating examples of a driving pattern of a semiconductor pumping laser, a laser output pattern of a laser oscillator, and an output pattern of a galvano driving signal for a galvano scanner in the laser machining device according to the third embodiment.

DETAILED DESCRIPTION

A laser machining device and a method of controlling laser machining with the laser machining device according to first to third embodiments of the present disclosure will be described in detail with reference to the drawings. Firstly, a schematic configuration of a laser machining device 1 according to the first embodiment will be described with reference to FIGS. 1 through 3.

First Embodiment

Figure 1:
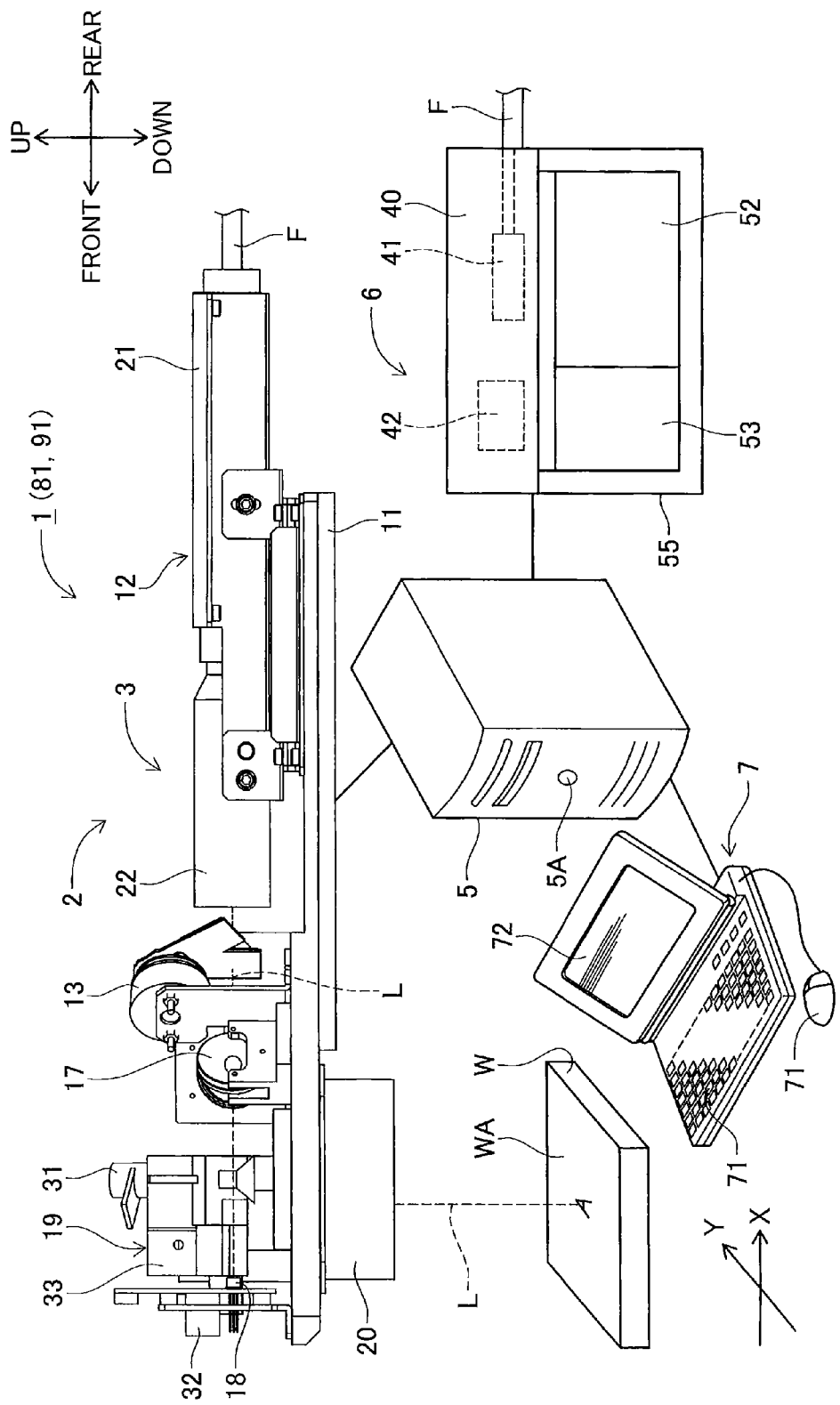
FIG. 1 is a schematic view of a laser machining device according to embodiments of the present disclosure.

As illustrated in FIG. 1, the laser machining device 1 according to the first embodiment includes a device main unit 2, a laser controller 5, and a power unit 6. The device main unit 2 executes laser machining in which a pulsed laser (hereinafter referred to as a "laser beam L") scans a machining surface WA of a workpiece W two-dimensionally.

The laser controller 5 is configured of a computer, and is connected to a personal computer (hereinafter referred to as "PC") 7 so as to be capable of performing bi-directional communications therebetween. The laser controller 5 is also electrically connected to the device main unit 2 and the power unit 6. As illustrated in FIG. 1, the PC 7 is configured of an input manipulation unit 71 including a mouse and a keyboard, a liquid crystal display (LCD) 72, and the like, and is used for generating printing data, inputting a command, and the like. The laser controller 5 drives and controls the device main unit 2 and the power unit 6 according to the printing data, control parameters, and various types of command data transmitted from the PC 7.

Note that FIG. 1 shows only the schematic configuration of the laser machining device 1. Thus, the device main unit 2 is schematically illustrated in FIG. 1, and the specific configuration of the device main unit 2 will be described later in detail.

[Schematic Configuration of Device Main Unit]

Next, the schematic configuration of the device main unit 2 will be described with reference to FIGS. 1 and 2. In the description about the device main unit 2, an emitting direction of the laser beam L from a laser oscillator 21 (described later) is a frontward direction. Also, a direction perpendicular to a main base 11 (described later) is upward/downward directions. Further, a direction perpendicular to both upward/downward directions and frontward/rearward directions of the device main unit 2 is leftward/rightward directions of the device main unit 2. Thus, the leftward, rightward, upward, and downward in FIG. 1 respectively correspond to frontward, rearward, upward, and downward of the device main unit 2 as indicated in FIG. 1.

Figure 2:
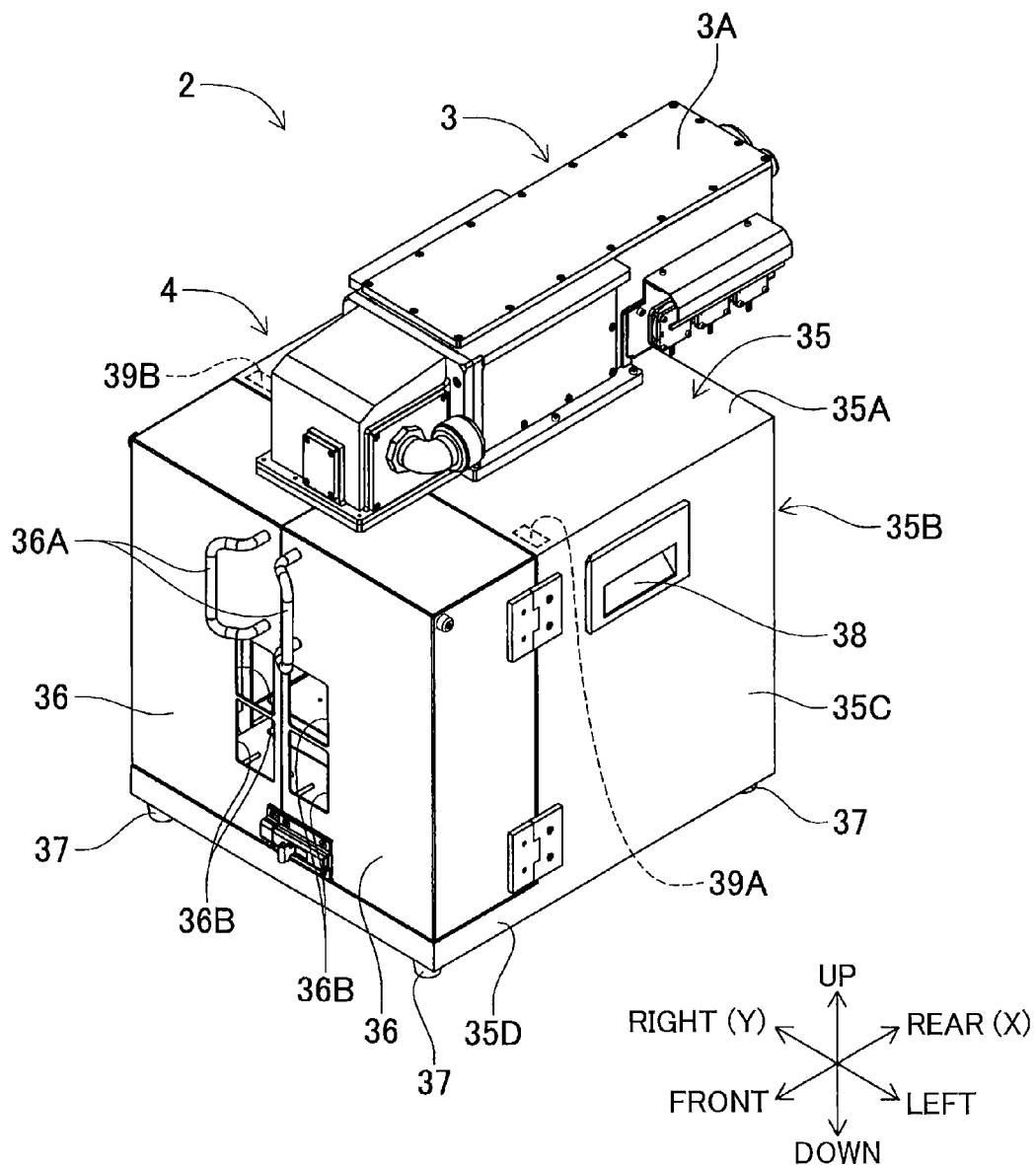
FIG. 2 is a perspective view showing an exterior appearance of a device main unit of the laser machining device according to the embodiments.

As illustrated in FIGS. 1 and 2, the device main unit 2 includes a laser head unit 3 coaxially emitting the laser beam L and a visible laser beam from an fθ lens 20, and a substantially box-shaped machining chamber 4 having an upper plate part 35A on which the laser head unit 3 is fixed. The device main unit 2 includes the main base 11, a laser oscillation unit 12 configured to emit the laser beam L, a light shutter 13, a light damper (not shown), a half mirror (not shown), a guide optical section (not shown) configured to emit the visible laser beam, a reflection mirror 17, an optical sensor 18, a galvano scanner 19, the fθ lens 20, and the like. The laser head unit 3 is housed in a substantially cuboid-shaped housing 3A.

The laser oscillation unit 12 includes the laser oscillator 21, a beam expander 22, and a mounting base. The laser oscillator 21 has a fiber connector, a condenser lens, a reflection mirror, a laser medium, a passive Q-switch, an output coupler, and a window, which are accommodated in a casing. The fiber connector is in optical communication with an optical fiber F extending from a semiconductor laser pumping unit 40. Pump light emitted from the semiconductor laser pumping unit 40 is incident via the optical fiber F.

The condenser lens concentrates the pump light incident from the fiber connector. The reflection mirror allows the pump light concentrated by the condenser lens to pass therethrough and simultaneously reflects the laser beam emitted from the laser medium at high efficiency. The laser medium is pumped by the pump light emitted from the semiconductor laser pumping unit 40 to oscillate the laser beam. For example, neodymium doped gadolinium vanadate (Nd:GdVO4) crystal to which neodymium (Nd) is doped as laser active ion, neodymium doped yttrium vanadate (Nd:YVO4) crystal, and Nd:YAG crystal may be used as the laser medium.

The passive Q-switch is crystal having properties that a penetration rate becomes a value from 80% to 90% when optical energy stored therein exceeds a certain value. Thus, the passive Q-switch functions as a Q-switch for oscillating the laser beam oscillated from the laser medium as the pulsed laser having a pulse shape. For example, chrome YAG (Cr:YAG) crystal and Cr:MgSiO4 crystal may be used as the passive Q-switch.

The output coupler constitutes the reflection mirror and a laser resonator. The output coupler is, for example, a partial reflection mirror configured of a concave mirror having a surface coated with a dielectric layer film. The partial reflection mirror has a reflection rate from 80% to 95% in a wavelength of 1063 nm. The window is formed of synthetic silica and the like, and allows the laser beam emitted from the output coupler to pass therethrough outwardly.

Thus, when the laser oscillator 21 receives the pump light having an output greater than a "laser output threshold" from the semiconductor laser pumping unit 40 via the optical fiber F, the laser oscillator 21 oscillates the pulsed laser corresponding to the pump light through the passive Q-switch and outputs the pulsed laser as the laser beam L for performing the marking machining the machining surface WA of the workpiece W. Here, the "laser output threshold" is the maximum output value of the pump light with no oscillation. In other words, when the pump light having an output equal to or smaller than the laser output threshold is received, the laser oscillator 21 does not oscillate the pulsed laser.

The beam expander 22 changes a beam diameter of the laser beam L, for example, enlarges the beam diameter, and is attached in coaxial relation to the axis of the laser oscillator 21. The laser oscillator 21 is mounted on the mounting base so as to be capable of adjusting an optical axis of the laser beam L. The mounting base is fixed by each mounting screw at a position rearward from the center position in the frontward/rearward directions with respect to the upper surface of the main base 11.

The light shutter 13 includes a shutter motor, and a shutter having a plate shape. The shutter is attached to a motor shaft of the shutter motor. The light shutter 13 is configured to be capable of interrupting an optical path of the laser beam L emitted from the beam expander 22 by moving the shutter. On one hand, when the shutter is moved to the position where the optical path of the laser beam L is interrupted, the shutter reflects the laser beam L toward the light damper which is located rightward from the light shutter 13. On the other hand, when the shutter is moved to the position out of the optical path of the laser beam L, the laser beam L is incident upon the half mirror which is located forward the light shutter 13.

The light damper absorbs the laser beam L reflected by the shutter. The half mirror is disposed so that the surface of the half mirror is oriented in diagonally frontward left direction to form 45 degrees with respect to the optical path of the laser beam L. The half mirror allows substantially all the laser beam L incident onto the rear side of the half mirror to pass therethrough. A part of the laser beam L incident into the rear side of the half mirror is reflected at 45 degrees so as to be directed toward the reflection mirror 17. The reflection mirror 17 is disposed at a left-side position relative to the central portion on the rear surface of the half mirror upon which the laser beam L is incident.

The reflection mirror 17 is disposed in the optical path of the laser beam L in an orientation to face diagonally frontward left direction to form 45 degrees relative to the frontward direction parallel to the optical path. A part of the laser beam L reflected upon the rear surface of the half mirror is incident upon the central portion of the reflection surface of the reflection mirror 17 at incident angle of 45 degrees. The reflection mirror 17 directs the laser beam L incident upon the reflecting surface of the reflection mirror 17 in the frontward direction at a reflection angle of 45 degrees.

The optical sensor 18 is configured from a photodetector capable of detecting light intensity of the laser beam L and the like. As illustrated in FIG. 1, the optical sensor 18 is disposed in front of the reflection mirror 17 so as to receive the laser beam L emitted from the central portion of the reflection mirror 17 upon which the laser beam L is reflected. With such a positional relationship between the reflection mirror 17 and the optical sensor 18, the light intensity of the laser beam L can be detected. In this manner, the light intensity of the laser beam L emitted from the laser oscillator 21 can be detected with the optical sensor 18.

An opening is formed in a front portion of the main base 11. The galvano scanner 19 is disposed above the opening of the main base 11 and directs the laser beam L emitted from the laser oscillation unit 12 and the visible laser beam reflected upon the rear surface of the half mirror 15 downward through the opening and performs two-dimensional scan. More specifically, the galvano scanner 19 includes a galvano X-axis motor 31, a galvano Y-axis motor 32, and a main unit 33. The galvano X-axis motor 31 and the galvano Y-axis motor 32 are mounted on the main unit 33. The motor shafts of the galvano X-axis motor 31 and the galvano Y-axis motor 32 are inserted into the respective openings formed in the main unit 33, and are arranged orthogonal to each other.

A scan mirror is movably attached to the tip end of each motor shaft. Thus, in the galvano scanner 19, the two scan mirrors diagonally face each other and perform two-dimensional scans while moving in cooperation with each other. Controlling the rotations of the galvano X-axis motor 31 and the galvano Y-axis motor 32 changes the reflecting angles of the respective scan mirrors. As a result, the laser beam L and the visible laser beam are directed downward and perform two-dimensional scans for scanning the laser beams in the frontward/rearward direction (X direction) and the leftward/rightward direction (Y direction).

The fθ lens 20 operates to coaxially collimate the two-dimensionally scanning laser beam L and the visible laser beam onto the machining surface WA of the workpiece W disposed below the fθ lens 20. In this manner, by controlling the rotations of the galvano X-axis motor 31 and the galvano Y-axis motor 32, the laser beam L and the visible laser beam perform two-dimensional scan in both the frontward/rearward direction (X direction) and the leftward/rightward direction (Y direction) onto the machining surface WA of the workpiece W, thereby forming a desired machining pattern on the machining surface WA of the workpiece W. In the present embodiment, each of the galvano X-axis motor 31 and the galvano Y-axis motor 32 is positioned at its original position in the initial state of the laser machining device 1 so that the laser beam L and the visible laser beam from the galvano scanner 19 are irradiated onto the position corresponding to an origin in the X- and Y-coordinate system. That is, the laser beam L and the visible laser beam perform two-dimensional scan in a predetermined area from the origin in both the X and Y directions onto the machining surface WA of the workpiece W while rotating the galvano X-axis motor 31 and the galvano Y-axis motor 32.

Next, a schematic configuration of the machining chamber 4 will be described with reference to FIG. 2. As illustrated in FIG. 2, the machining chamber 4 includes a box-shaped main box unit 35, a pair of doors 36, and a machining base (not shown). An opening is formed in a front portion of the main box unit 35, and the doors 36 cover the opening of the main box unit 35. The machining base is provided for placing the workpiece W thereon. The main box unit 35 and the doors 36 are made of steel, stainless, or the like to interrupt the laser beam L reflected upon the workpiece W.

The main box unit 35 includes the upper plate part 35A, a back plate part 35B, a pair of side walls 35C, and a bottom part 35D. The upper plate part 35A is formed of a substantially rectangular shape, and the laser head unit 3 is disposed on and supported by the upper plate part 35A. The back plate part 35B is formed of a rectangular shape, and defines a back side wall of the main box unit 35. Each of the side walls 35C including a left side wall 35C and a right side wall 35C is formed of a rectangular shape. The left side wall 35C defines a left side wall of the main box unit 35, and the right side wall 35C defines a right side wall of the main box unit 35. The bottom part 35D is formed of a square frame shape, and is provided to protrude, for example, about 30 cm, forward from each side wall 35C. Thus, the main box unit 35 is formed with an opening at a front surface side thereof and an upper side of a protruding part of the bottom part 35D.

Each of the doors 36 including a left door 36 and a right door 36 bilaterally and symmetrically covers the front side opening of the main box unit 35. The doors 36 are mounted as a double door. Hereinafter, the term "door 36" is also used for indicating the double door 36 including the left door 36 and the right door 36. The left door 36 is pivotally attached to the front edge portion of the left side wall 35C via a pair of hinges so as to rotate about the attached part outward in the leftward direction by 180 degrees from the closed state of the front side opening. Similarly, the right door 36 is pivotally attached to the front edge portion of the right side wall 35C via a pair of hinges so as to rotate about the attached part outward in the rightward direction by 180 degrees from the closed state of the front side opening. Each door 36 has a front upper end portion provided with a handle 36A having a substantial horseshoe shape, and is formed with a pair of penetration holes 36B having a squared shape below each handle 36A neighboring to each other in the upward/rearward direction. Each of the pair of penetration holes 36B is closed by a transparent plate made of transparent glass or an acrylic plate and transmitting the visible laser beam.

The upper plate part 35A of the main box unit 35 has a front end portion provided with door switches 39A and 39B detecting opening and closing of corresponding door 36. More specifically, the door switch 39A is disposed on the left side of the front end portion of the upper plate part 35A, and detects opening and closing of the left door 36. The door switch 39B is disposed on the right side of the front end portion of the upper plate part 35A, and detects opening and closing of the right door 36. Each of the door switches 39A and 39B is configured of mechanical switch and adapted to output, to the laser controller 5, an OFF signal when the corresponding door 36 is closed, and an ON signal when the corresponding door 36 is open.

The machining chamber 4 has leg members 37 at four corners on a bottom surface of the bottom part 35D of the main box unit 35. The laser head unit 3 and the machining chamber 4 are placed on a floor through the leg members 37. Both of the left and right side walls 35C respectively have upper end portions, and a grip member 38 is provided at a substantial center portion of each upper end portion in the frontward/rearward direction. Each grip member 38 has laterally-long quadrangular opening depressed inward. Thus, a user can carry the laser head unit 3 and the machining chamber 4 by holding the grip members 38 with both hands.

Although not illustrated in the drawings, the upper plate part 35A of the main box unit 35 is formed with a substantial circular insertion hole into which the fθ lens 20 of the laser head unit 3 is inserted. Thus, the device main unit 2 can perform the marking machining by irradiating the machining surface WA of the workpiece W disposed on the machining base inside the machining chamber 4 with the laser beam L and the visible laser beam.

[Schematic Configuration of Power Unit]

Next, the schematic configuration of the power unit 6 in the laser machining device 1 will be described with reference to the drawings. As illustrated in FIG. 1, the power unit 6 includes the semiconductor laser pumping unit 40, a power supply unit 52, and a temperature control unit 53. In the power unit 6, the semiconductor laser pumping unit 40 is disposed at an upper portion of a casing 55 in which the power supply unit 52 and the temperature control unit 53 are accommodated.

The semiconductor laser pumping unit 40 is optically connected to the laser oscillator 21 through the optical fiber F. The semiconductor laser pumping unit 40 is configured to be capable of emitting the pump light for pumping the laser medium in the laser oscillator 21 and allowing the pump light to be incident upon the laser oscillator 21. The semiconductor laser pumping unit 40 accommodates a semiconductor pumping laser 41 functioning as a laser emitter, a laser driver 42, and various components in a substantially cuboid-shaping housing.

The laser driver 42 supplies a pulse-shaped driving current to the semiconductor pumping laser 41 according to a driving control signal inputted from the laser controller 5. The semiconductor pumping laser 41 emits the pump light as a laser beam having an output proportional to a current value of the pulse shaped driving current inputted from the laser driver 42 into the optical fiber F linearly extending forward from the semiconductor laser pumping unit 40. Thus, the pump light from the semiconductor pumping laser 41 is incident upon the laser oscillator 21 via the optical fiber F. For example, a laser bar using the GaAs may be used as the semiconductor pumping laser 41.

The power supply unit 52 converts an AC power supplied from a power source functioning as a driving source of the laser machining device 1 into an available state for the laser machining device 1 and supplies the converted power to the laser machining device 1. The power supply unit 52 supplies the driving current for driving the semiconductor pumping laser 41 of the semiconductor laser pumping unit 40 to the laser driver 42 via a relay 66 (see FIG. 3). When the laser controller 5 controls the relay 66 to turn ON, the driving current is supplied to the laser driver 42, whereas when the laser controller 5 controls the relay 66 to turn OFF, the driving current to the laser driver 42 is interrupted.

The temperature control unit 53 governs overall control of the temperature of each unit constituting the laser machining device 1. The temperature control unit 53 is configured of a peltier driver and the like. The temperature control unit 53 controls the temperature of the laser oscillation unit 12, the semiconductor laser pumping unit 40, and the power supply unit 52. The temperature control unit 53 controls, for example, the temperature by an electric cooling system using a peltier element disposed on a bottom surface of the semiconductor pumping laser 41 according to detection results of a temperature sensor (not shown) disposed on an upper surface of the semiconductor pumping laser 41.

[Circuit Configuration of Laser Machining Device]

Figure 3:
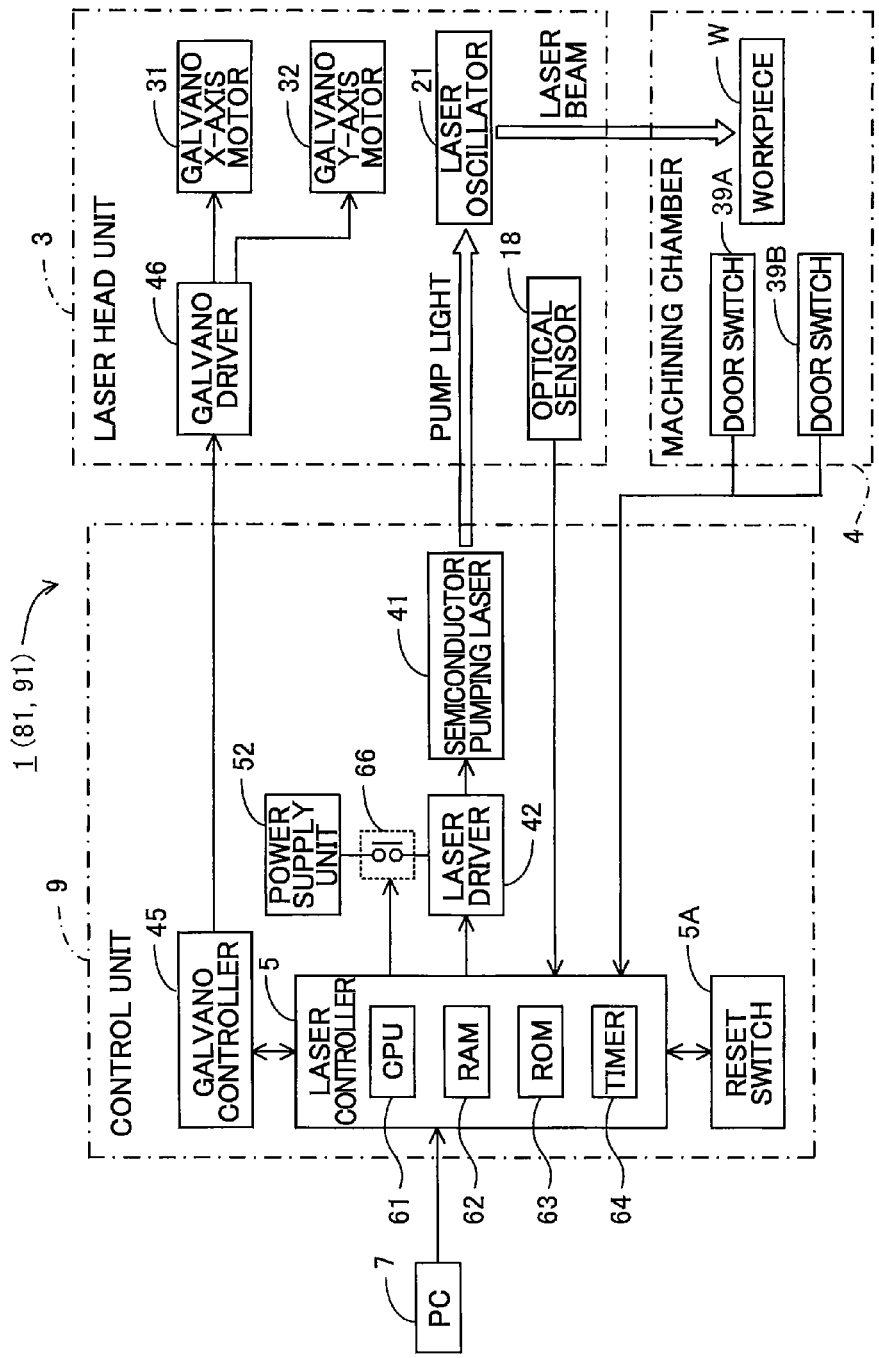
FIG. 3 is a block diagram showing an electrical configuration of the laser machining device according to the embodiments.

Next, the circuit configuration of the laser machining device 1 will be described with reference to FIG. 3. As illustrated in FIG. 3, the laser machining device 1 includes the machining chamber 4, the laser head unit 3 fixed on the upper plate part 35A of the machining chamber 4, and a control unit 9 controlling the laser head unit 3. The control unit 9 includes the laser controller 5 for governing overall operations of the laser machining device 1, a galvano controller 45, the semiconductor pumping laser 41, the laser driver 42, the power supply unit 52, the relay 66, and the like.

The laser controller 5 is in electrical communication with the galvano controller 45, the laser driver 42, the optical sensor 18 of the laser head unit 3, each of the door switches 39A and 39B of the machining chamber 4, and the like. The laser controller 5 is connected to the PC 7 so as to be capable of performing bi-directional communications therebetween. The laser controller 5 is configured to receive data transmitted from the PC 7, such as the printing data, the control parameters of the device main unit 2, and the various command data from the user. Further, a reset switch 5A is provided at a center portion on a front side of the laser controller 5 (see FIG. 1), and is in electrical communication with the laser controller 5. When the reset switch 5A is depressed, a release command signal for instructing to release an urgent stop state (described later) of the marking machining is outputted. The release command signal outputted from the reset switch 5A is accepted by the laser controller 5 as described later. Furthermore, a status LED (not shown) is provided at a front portion of the laser controller. The status LED indicates the status of the laser machining device 1. More specifically, when the status LED is turned ON, the laser machining device 1 is in a state capable of emitting the laser beam L.

The laser controller 5 includes a central processing unit (CPU) 61, a random access memory (RAM) 62, a read-only memory (ROM) 63, a timer 64, and the like. The CPU 61 is provided as an arithmetic device and a control device for governing overall operations of the laser machining device 1. The timer 64 is provided for measuring time. The CPU 61, the RAM 62, the ROM 63, and the timer 64 are interconnected via a bus line (not shown), and are in data communication with one another.

The RAM 62 temporarily stores various results of arithmetic operations performed by the CPU 61, X- and Y-coordinate data of a printing pattern according to the printing data transmitted from the PC 7, and the like. The ROM 63 stores various kinds of programs including a program for performing arithmetic operation to obtain X- and Y-coordinate data of the printing pattern according to the printing data transmitted from the PC 7 and storing the X- and Y-coordinate data in the RAM 62. Specifically, printing data inputted from the PC 7 represents images defined by positional information. A set of consecutive points derived from the positional information are treated as either a single straight line or an elliptic segment curved line, and X- and Y-coordinate data for each of such lines is obtained to define a printing pattern. The ROM 63 stores data regarding start point, end point, focal point, and curvature of each elliptic segment curved line that constitute a character with one of a plurality of fonts. Such data is stored in the ROM 43 on a font basis.

The ROM 63 stores a program for performing a first control process (see FIG. 4) in which the marking machining performed by the laser controller 5 is urgently stopped when the door 36 of the machining chamber 4 is opened and this urgent stop state is released. In the urgent stop state, the laser oscillator 21 in the laser machining device 1 is inhibited from emitting from emitting the laser beam L. The program for performing the first control process illustrated in FIG. 4 may be stored in a hard disk, read from a storage medium such as a CD-ROM (not shown), or downloaded through a network such as an Internet (not shown).

The CPU 61 executes various arithmetic and control processes in accordance with various programs stored in the ROM 63. For example, the CPU 61 receives printing data from the PC 7 and computes X- and Y-coordinate data of a printing pattern, galvano scanning speed data, and the like. Then, the CPU 61 outputs the resultant data to the galvano controller 56. Further, the CPU 61 outputs laser driving data for driving the semiconductor laser pumping unit 40 to the laser driver 42. The laser driver data includes data about pump light output [W] of the semiconductor laser pumping unit 40, a time duration [msec] of outputting the pump light, and the like which are set in accordance with the printing data inputted from the PC 7. Also, the CPU 61 outputs the X- and Y-coordinate data of the printing pattern, a galvano control signal for instructing ON/OFF of the galvano scanner 19 (hereinafter referred to as "machining signal") and the like to the galvano controller 45.

The galvano controller 45 is included in the control unit 9, and computes driving angles and rotational speeds of both the galvano X-axis motor 31 and the galvano Y-axis motor 32 according to the X- and Y-coordinate data, the galvano scanning speed data, and the like of the printing pattern inputted from the laser controller 5. Motor driving data representing the computed driving angle and the rotational speed is outputted to the galvano driver 46. The galvano driver 46 is included in the laser head unit 3, and drives and controls the galvano X-axis motor 31 and the galvano Y-axis motor 32 according to the motor driving data representing the driving angle and the rotational speed and inputted from the galvano controller 45, thereby performing two-dimensional scan of the laser beam L.

The laser driver 42 drives and controls the semiconductor pumping laser 41 according to the laser driving data such as the pumping light output [W] of the semiconductor pumping laser 41, the time duration [msec] of outputting the pump light, and the like inputted from the laser controller 5. The PC 7 is electrically connected to the input manipulation unit 71 including a mouse and a keyboard, and the LCD 72 via an input-output interface (not shown).

[First Control Process]

Next, the first control process will be described with reference to FIG. 4. The CPU 61 of the laser controller 5 performs the first control process in which the marking machining is urgently stopped when the door 36 of the machining chamber 4 is opened and this urgent stop state is released. The program, according to which the process illustrated in the flowchart of FIG. 4 is performed, is repeatedly executed by the CPU 61 at specified time intervals, for example, at 100 msec intervals from the activation of the laser controller 5.

Figure 4:
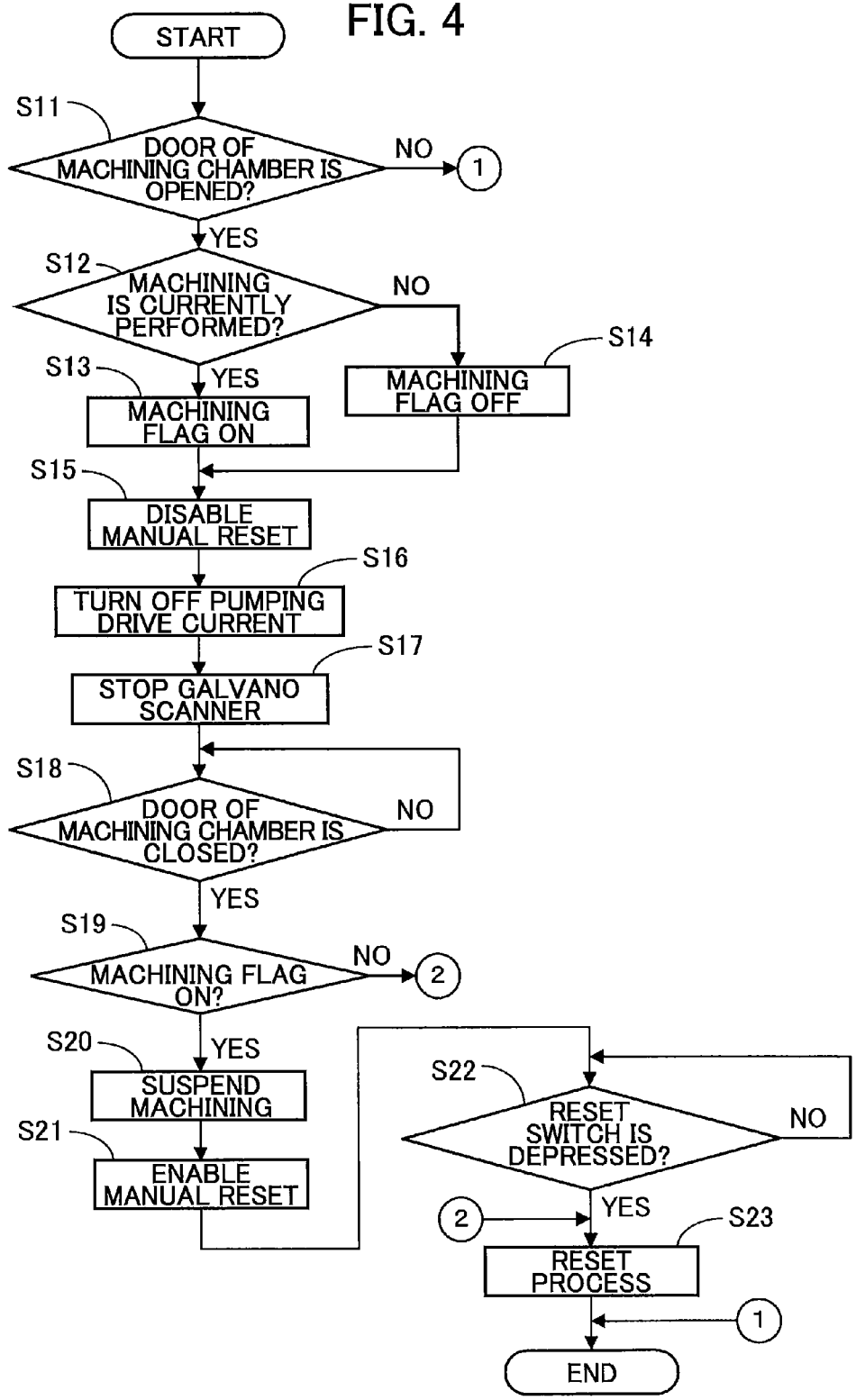
FIG. 4 is a flowchart illustrating steps in a first control process executed by a CPU of the laser machining device according to a first embodiment.

As illustrated in FIG. 4, in step (hereinafter abbreviated to "S") 11, the CPU 61 performs a determination process for determining whether to receive the ON signal from at least one of the door switches 39A and 39B, i.e., whether at least one of the doors 36 of the machining chamber 4 is open. If the CPU 61 receives the OFF signals from both the door switches 39A and 39B (S11: NO), i.e., both the doors 36 of the machining chamber 4 are closed, the CPU 61 ends the first control process.

On the other hand, if the CPU 61 receives the ON signal from at least one of the door switches 39A and 39B, the CPU 61 determines that the door 36 of the machining chamber 4 is open (S11: YES), and advances to S12. In S12 the CPU 61 performs a determination process for determining whether the marking machining according to the printing data is performed. That is, the CPU 61 turns ON the relay 66 to supply the drive current to the laser driver 42 and performs a determination process for determining whether a pumping drive current is supplied to the semiconductor pumping laser 41 via the laser driver 42.

If the determination is made that the marking machining according to the printing data is currently performed, i.e., the pumping drive current is supplied to the semiconductor pumping laser 41 via the laser driver 42 (S12: YES), the CPU 61 advances to S13. In S13 the CPU 61 reads a machining flag from the RAM 62, sets the machining flag to ON, and re-stores it in the RAM 62. The CPU 61 then advances to S15 described later. Note that the machining flag indicates whether the machining is currently performed by the laser machining device 1, and the machining flag is set to ON when the machining is currently performed whereas the machining flag is set to OFF when the machining is not currently performed. The machining flag is set to OFF and stored in the RAM 62 when the laser controller 5 is activated.

On the other hand, if the determination is made that the marking machining according to the printing data is not currently performed data, i.e., the pumping drive current is not supplied to the semiconductor pumping laser 41 via the laser driver 42 (S12: NO), the CPU 61 advances to S14. In S14 the CPU 61 reads the machining flag from the RAM 62, sets the machining flag to OFF, and re-stores it in the RAM 62. The CPU 61 then advances to S15.

In S15 the CPU 61 goes into a state not to accept the release command signal for instructing to release the urgent stop state of the marking machining from the reset switch 5A, i.e., disables the manual reset by the user. Subsequently, in S16 the CPU 61 interrupts the drive current supplied from the power supply unit 52 to the laser driver 42 by driving the relay 66 to turn OFF. That is, the CPU 61 urgently stops the irradiation of the pump light by setting the pumping drive current supplied to the semiconductor pumping laser 41 to turn OFF, thereby setting the laser oscillator 21 not to emit the laser beam L.

In S17 the CPU 61 outputs galvano scanner stop command data for instructing to stop the galvano X-axis motor 31 and the galvano Y-axis motor 32 to the galvano controller 45. As a result, the galvano controller 45 urgently stops the galvano X-axis motor 31 and the galvano Y-axis motor 32 through the galvano driver 46 to urgently stop the galvano scanner 19.

After that, in S18 the CPU 61 waits until the user re-closes each door 36 of the machining chamber 4 (S18: NO). That is, the CPU 61 waits for receiving the OFF signals from both the door switches 39A and 39B. If the CPU 61 determines that the user re-closes the doors 36 of the machining chamber 4, i.e., the OFF signals are inputted from both the door switches 39A and 39B (S18: YES), the CPU 61 advances to S19.

In S19 the CPU 61 reads the machining flag from the RAM 62 and performs a determination process for determining whether the machining flag is set to ON. If the CPU 61 determines that the machining flag is set to OFF (S19: NO), the CPU 61 advances to S23 described later. On the other hand, if the CPU 61 determines that the machining flag is set to ON (S19: YES), the CPU 61 advances to S20. In S20, the CPU 61 suspends the currently performed marking machining, performs arithmetic operation to obtain X- and Y-coordinate data for an initial printing position of the printing data representing a character, a symbol, a graphic, and the like, and stores the X- and Y-coordinate data as a printing start position in the RAM 62.

In S21 the CPU 61 goes into a state to accept the release command signal for instructing to release the urgent stop state of the marking machining from the reset switch 5A, i.e., enables the manual reset by the user. Subsequently, in S22 the CPU 61 waits until the reset switch 5A is depressed by the user and the release command signal for instructing to release the urgent stop state of the marking machining is inputted (S22: NO).

If the determination is made that the reset switch 5A is depressed by the user, i.e., the release command signal for instructing to release the urgent stop state of the marking machining is inputted (S22: YES), the CPU 61 advances to S23. In S23 the CPU 61 performs a reset process for resetting the laser machining device 1 to a state in which the marking machining can be performed. More specifically, the CPU 61 controls the relay 66 to turn ON to supply the drive current from the power supply unit 52 to the laser driver 42. The CPU 61 also instructs the laser driver 42 to set the semiconductor pumping laser 41 to a standby state in which the pump light is not emitted.

The CPU 61 outputs, to the galvano controller 45, origin return data for instructing the galvano X-axis motor 31 and the galvano Y-axis motor 32 to return to the respective original positions. The galvano controller 45 computes the driving angles and the rotational speeds of both the galvano X-axis motor 31 and the galvano Y-axis motor 32 for rotationally driving the galvano X-axis motor 31 and the galvano Y-axis motor 32 to reach the original position. The motor driving data representing the computed driving angle and the rotational speed is outputted to the galvano driver 46. The galvano driver 46 drives and controls the galvano X-axis motor 31 and the galvano Y-axis motor 32 according to the motor driving data inputted from the galvano controller 45, thereby respectively returning the galvano X-axis motor 31 and the galvano Y-axis motor 32 to the original positions.

Further, if the CPU 61 is in the state not to accept the release command signal for instructing to release the urgent stop state of the marking machining, the CPU 61 returns into the state to accept the release command signal, i.e., enables the manual reset by the user. Subsequently, the CPU 61 turns on the status LED (not shown) indicating that the laser machining device 1 is in a state capable of emitting the laser beam L, and ends the process illustrated in FIG. 4.

In the present embodiment, the laser head unit 3 is an example of the laser head of the present disclosure. The semiconductor pumping laser 41, the optical fiber F, and the laser oscillator 21 are examples of the laser emitter of the present disclosure, and the galvano scanner 19 is an example of the scanner of the present disclosure. The door switches 39A and 39B are examples of the detector of the present disclosure. The laser driver 42 and the galvano driver 46 are examples of the driver of the present disclosure. The reset switch 5A is an example of the interface of the present disclosure. The CPU 61 is an example of the controller of the present disclosure.

As described above, in the laser machining device 1 according to the first embodiment, when the door 36 of the machining chamber 4 is opened and the semiconductor pumping laser 41 and the galvano scanner 19 are urgently stopped while the marking machining according to the printing data is performed, the CPU 61 sets the machining flag to ON and stores it in the RAM 62. On the other hand, when the door 36 of the machining chamber 4 is opened and the semiconductor pumping laser 41 and the galvano scanner 19 are urgently stopped while the marking machining according to the printing data is not performed, the CPU 61 sets the machining flag to OFF and stores it in the RAM 62. After that, the CPU 61 releases the urgent stop state and resets the laser machining device 1 to a state where the marking machining can be resumed if the machining flag is set to OFF when it is detected that both the doors 36 are closed.

As a result, if at least one door 36 is opened and the urgent stop state occurs while the marking machining according to the printing data is not performed, i.e., while the machining is not performed, the urgent stop state is automatically released and the laser machining device 1 is reset to a state capable of resuming the marking machining at the timing when both the doors 36 are closed. Therefore, the time required for resuming the marking machining can be reduced, that results in reduction of the machining time.

On the other hand, if the machining flag is set to ON at the timing when detecting that both the doors 36 are closed, the CPU 61 enables the reset switch 5A and waits for depression of the reset switch 5A. When the reset switch 5A is depressed, the CPU 61 releases the urgent stop state and resets the laser machining device 1 to the state capable of resuming the marking machining.

As a result, if at least one door 36 is opened and the urgent stop state occurs while the marking machining according to the printing data is performed, i.e., while the machining is performed, the urgent stop state is not automatically released at the timing when both the doors 36 are closed but released upon depression of the reset switch 5A to input the release command signal for instructing to release the urgent stop state of the marking machining by the user after both the doors 36 are closed. Therefore, the safety of the marking machining with the laser machining device 1 is ensured.

Second Embodiment

Next, a laser machining device 81 according to a second embodiment will be described with reference to FIGS. 5 through 8. In the following description, like parts and components the same as or corresponding to the laser machining device 1 according to the first embodiment have been designated with the same reference numerals to avoid duplicating description.

An entire configuration of the laser machining device 81 according to the second embodiment is substantially the same as that of the laser machining device 1 according to the first embodiment. A control system and a control process of the laser machining device 81 according to the second embodiment is substantially the same as that of the laser machining device 1 according to the first embodiment.

The CPU 61 of the laser machining device 81 according to the second embodiment performs a "second control process" (see FIGS. 5 and 6) described later instead of the "first control process" (see FIG. 4), which is different from the laser machining device 1 according to the first embodiment.

The second control process will be described with reference to FIGS. 5 through 8. The CPU 61 of the laser machining device 81 performs the second control process in which the marking machining is urgently stopped when the door 36 of the machining chamber 4 is opened and this urgent stop state is released. The program, according to which the second control process illustrated in the flowchart of FIGS. 5 and 6 is performed, is preliminarily stored in the ROM 63 and is repeatedly executed by the CPU 61 at specified time intervals, for example, at 100 msec intervals from the activation of the laser controller 5.

Figure 5:
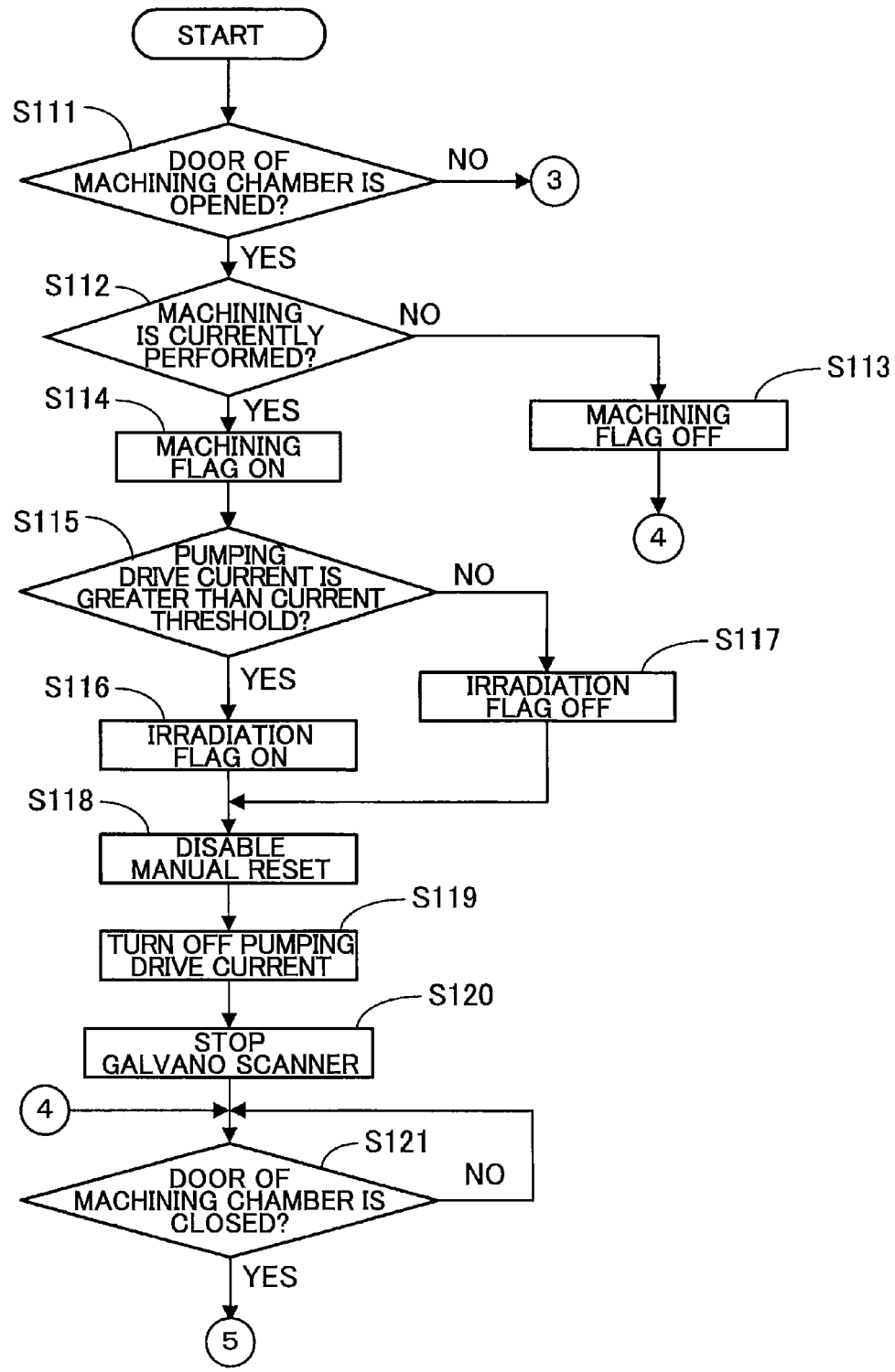
FIG. 5 is a first flowchart illustrating steps in a second control process executed by a CPU of the laser machining device according to a second embodiment.
Figure 6:
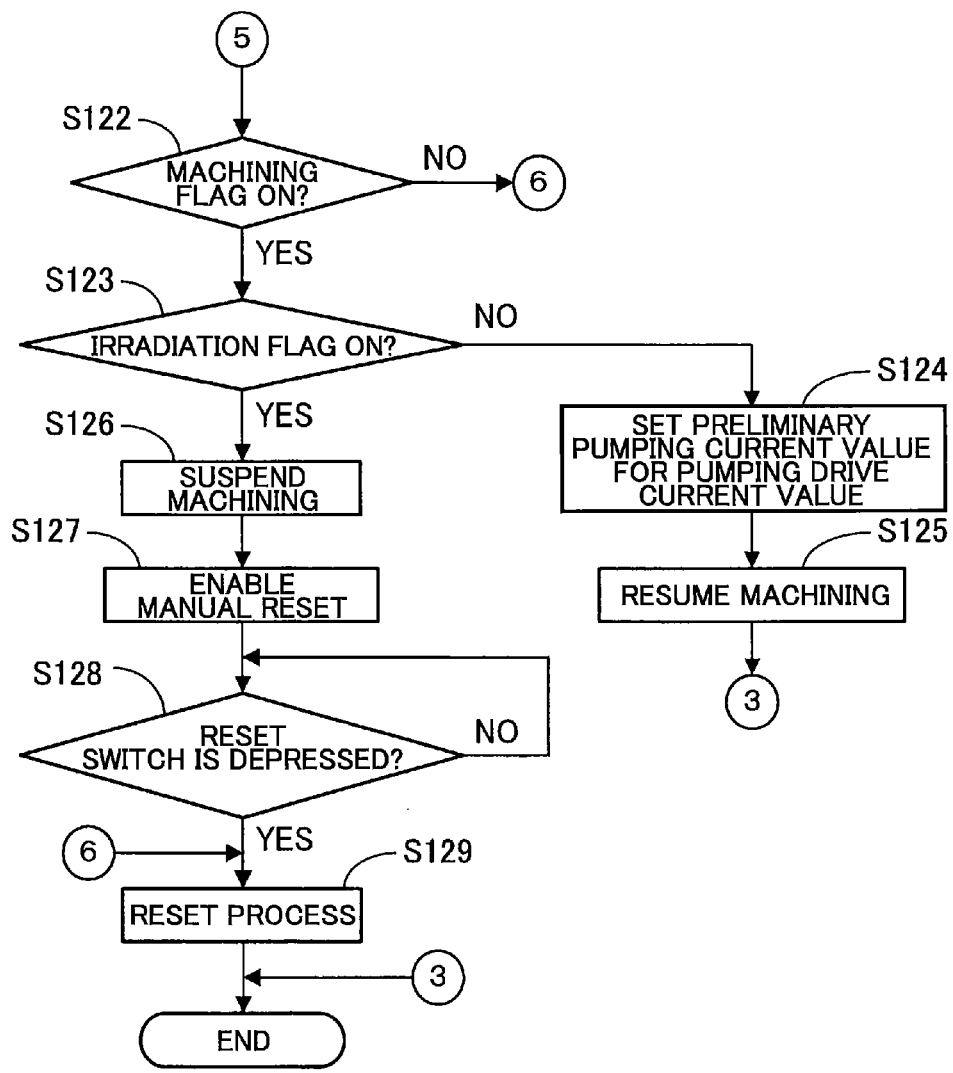
FIG. 6 is a second flowchart illustrating steps in the second control process executed by the CPU of the laser machining device according to the second embodiment.

As illustrated in FIGS. 5 and 6, in S111 and S112 the CPU 61 performs the same processes as the processes of S11 and S12 illustrated in FIG. 4. If the determination is made that the marking machining according to the printing data is not currently performed, i.e., the semiconductor pumping laser 41 is not supplied with the pumping drive current via the laser driver 42 (S112: NO), the CPU 61 advances to S113. In S113 the CPU 61 reads a machining flag from the RAM 62, sets the machining flag to OFF, and re-stores it in the RAM 62. CPU 61 then advances to S121 described later. Note that the machining flag was set to OFF and stored in the RAM 62 when the laser controller 5 was activated.

On the other hand, if the determination is made that the marking machining according to the printing data is currently performed, i.e., the pumping drive current is supplied to the semiconductor pumping laser 41 via the laser driver 42 (S112: YES), the CPU 61 advances to S114. In S114 the CPU 61 reads the machining flag from the RAM 62, sets the machining flag to ON, and re-stores it in the RAM 62.

In S115 the CPU 61 performs a determination process for determining whether the current value of the pumping drive current supplied to the semiconductor pumping laser 41 via the laser driver 42 upon the instruction from the CPU 61 is greater than a "current threshold." The "current threshold" is a current value of a pumping drive current corresponding to the maximum output value of the pump light which does not oscillate the pulsed laser (laser beam L) from the laser oscillator 21. That is, in S115 the CPU 61 performs a determination process for determining whether the laser beam L is emitted from the laser oscillator 21 and irradiated onto the machining surface WA of the workpiece W. Note that the "current threshold" is the current value of the pumping drive current corresponding to the maximum output value of the pump light which does not oscillate the pulsed laser (laser beam L) from the laser oscillator 21, and has been stored in the ROM 63 in advance.

If the determination is made that the current value of the pumping drive current supplied to the semiconductor pumping laser 41 via the laser driver 42 upon the instruction from the CPU 61 is greater than the "current threshold," i.e., the laser oscillator 21 emits the laser beam L (S115: YES), the CPU 61 advances to S116. In S116 the CPU 61 reads an irradiation flag from the RAM 62, sets the irradiation flag to ON, and re-stores it in the RAM 61. The CPU 61 then advances to S118 described later. Note that the irradiation flag indicates whether the laser beam L is currently irradiated onto the machining surface WA of the workpiece, i.e., the laser beam L is emitted from the laser oscillator 21, and the irradiation flag is set to ON when the laser beam L is currently irradiated whereas the irradiation flag is set to OFF when the laser beam L is not currently irradiated. The irradiation flag is set to OFF and stored in the RAM 62 when the laser controller 5 is activated.

On the other hand, if the determination is made that the current value of the pumping drive current supplied to the semiconductor pumping laser 41 via the laser driver 42 upon the instruction from the CPU 61 is less than or equal to the "current threshold," i.e., the laser oscillator 21 does not emit the laser beam L (S115: NO), the CPU 61 advances to S117. In S117 the CPU 61 reads the irradiation flag from the RAM 62, sets the irradiation flag to OFF, and re-stores it in the RAM 62. The CPU 61 then advances to S118 described later.

In S118 through S122 the CPU 61 performs the same processes as the processes of S15 through S19 illustrated in FIG. 4. If the CPU 61 determines that the machining flag is set to OFF, i.e., the machining is not currently performed (S122: NO), the CPU 61 advances to S129 described later, performs the same process as the process in S23 illustrated in FIG. 4, and ends the second control process. On the other hand, if the CPU 61 determines that the machining flag is set to ON, i.e., the machining is currently performed (S122: YES), the CPU 61 advances to S123.

In S123 the CPU 61 reads the irradiation flag from the RAM 62, and performs a determination process for determining whether the irradiation flag is set to ON. If the determination is made that the irradiation flag is set to OFF (S123: NO), the CPU 61 advances to S124.

In S124 the CPU 61 instructs the laser driver 42 to supply a preliminary pumping current having a current value L1 [A] to the semiconductor pumping laser 41. The current value L1 [A] of the preliminary pumping current is less than or equal to the "current threshold." The "current threshold" is, as described above, the current value of the pumping drive current corresponding to the maximum output value of the pump light which does not oscillate the pulsed laser (laser beam L) from the laser oscillator 21. As a result, the pump light which does not oscillate the pulsed laser is incident upon the laser oscillator 21 through the optical fiber F. Thus, the laser oscillator 21 transits to a low pumped state where the laser oscillator 21 does not emit the laser beam L but accumulates the optical energy inside the passive Q-switch. The current value L1 [A] of the preliminary pumping current is preferably equal to or close to the "current threshold."

Data including "machining speed," the X- and Y-coordinate data of the printing pattern, and pumping drive current data for performing one machining process have been inputted via the PC 7 and stored in the RAM 62. In S125 the CPU 61 reads, from the RAM 62, the "machining speed," the X- and Y-coordinate data of the printing pattern, and pumping drive current data for the marking machining from when the door 36 of the machining chamber 4 is opened. The machining speed means the marking speed by the laser beam L in the marking machining. The pumping drive current data represents a driving pattern of the semiconductor pumping laser 41. The printing pattern is generated according to the printing data representing a character, a symbol, a graphic, and the like. The pumping drive current data represents a driving pattern of the semiconductor pumping laser 41.

The CPU 61 supplies the pumping drive current to the semiconductor pumping laser 41 via the laser driver 42 in accordance with the driving pattern of the semiconductor pumping laser 41 for the marking machining from when the door 36 of the machining chamber 4 is opened so that the pump light is emitted. The CPU 61 also outputs, to the galvano controller 45, the "machining speed" and the X- and Y-coordinate data of the printing pattern for the marking machining from when the door 36 of the machining chamber 4 is opened.

Figure 7:
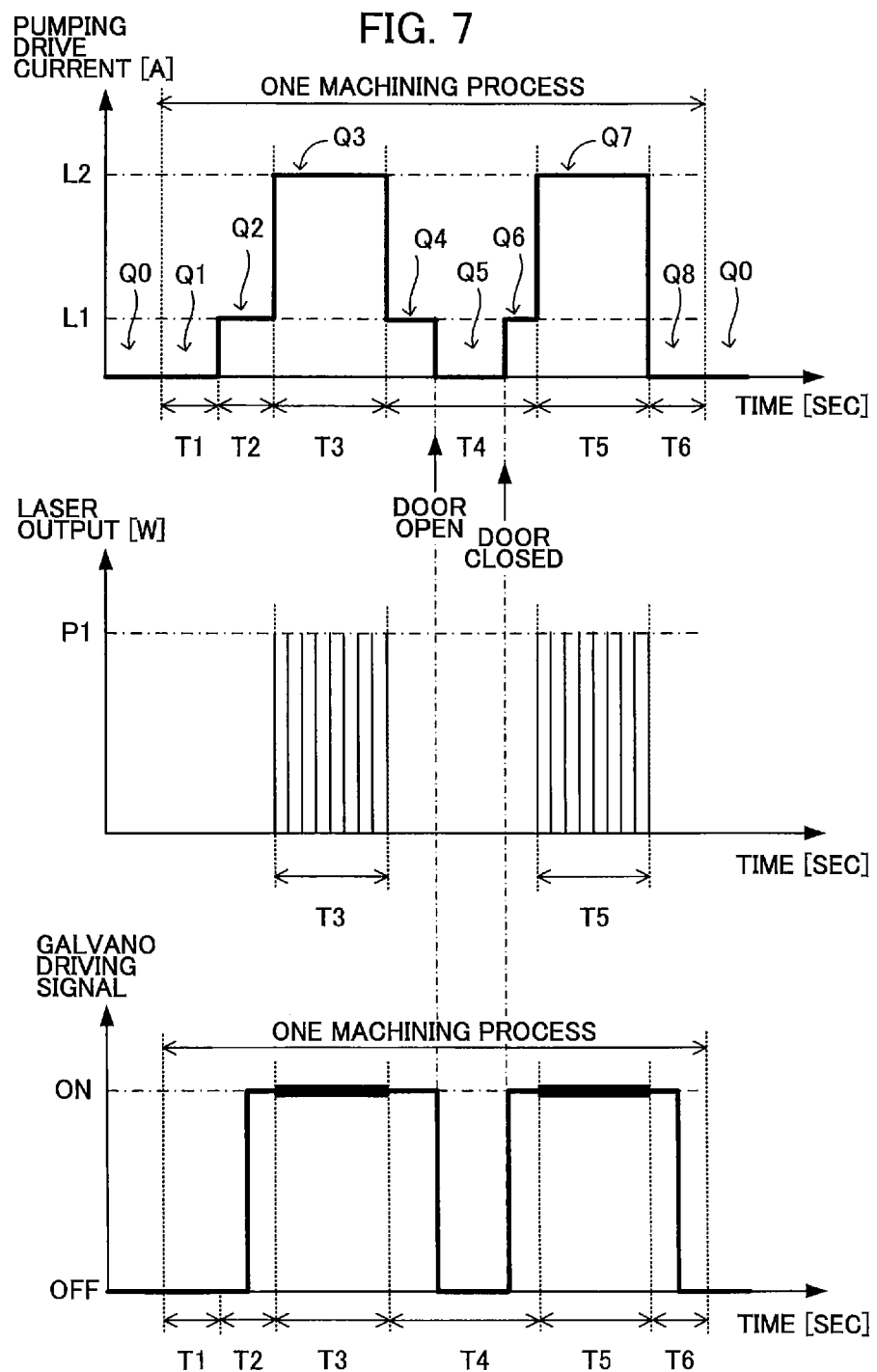
FIG. 7 is an explanatory diagram illustrating examples of a driving pattern of a semiconductor pumping laser, a laser output pattern of a laser oscillator, and an output pattern of a galvano driving signal for a galvano scanner in the laser machining device according to the second embodiment.

As illustrated in the lower part of FIG. 7, the CPU 61 resets the machining signal (galvano driving signal) for instructing to perform the machining with the laser beam L to "ON," outputs the same to the galvano controller 45, and then ends the second control process. In response, the galvano controller 45 starts to drive the galvano X-axis motor 31 and the galvano Y-axis motor 32 via the galvano driver 46 in accordance with the X- and Y-coordinate data of the printing pattern for the marking machining from when the door 36 of the machining chamber 4 is opened, and the printing pattern such as a character, a symbol, a graphic, and the like are continuously marked onto the machining surface WA of the workpiece W by scanning the laser beam L two-dimensionally.

The following description will be made about examples of the driving pattern of the semiconductor pumping laser 41 driven by the CPU 61 and the relationship between corresponding operation of the galvano scanner 19 and the laser oscillator 21 when the door 36 of the machining chamber 4 is closed in S125 with reference to FIGS. 7 and 8.

As illustrated in the upper part of FIG. 7, the driving pattern of the semiconductor pumping laser 41 until the door 36 of the machining chamber 4 is opened includes a standby state Q0, a first driving state Q1, a second driving state Q2, a third driving state Q3, and a fourth driving state Q4. More specifically, the CPU 61 first drives the semiconductor pumping laser 41 in the first driving state Q1 for a first output time duration T1 [sec] following the standby state Q0 in which the pump light output [W] of the semiconductor pumping laser 41 is zero [W]. In the first driving state Q1, the CPU 61 receives the printing data representing a character, a symbol, a graphic, and the like from the PC 7 and sets the pump light output to zero [W] without supplying the pumping drive current to the semiconductor pumping laser 41.

Following the first driving state Q1, the CPU 61 drives the semiconductor pumping laser 41 in the second driving state Q2 for a second output time duration T2 [sec]. In the second driving state Q2, the semiconductor pumping laser 41 is supplied with the preliminary pumping current having the current value L1 [A]. The current value L1 [A] of the preliminary pumping current is less than or equal to the "current threshold." The "current threshold" is the current value of the pumping drive current corresponding to the maximum output value of the pump light which does not oscillate the pulsed laser (laser beam L) from the laser oscillator 21. Further, as illustrated in the lower part of FIG. 7, the CPU 61 sets the machining signal for instructing to perform the machining with the laser beam L to "ON" and outputs the same to the galvano controller 45. In response, the galvano controller 45 starts to drive the galvano X-axis motor 31 and the galvano Y-axis motor 32 in accordance with the X- and Y-coordinate data of the printing pattern.

Following the second driving state Q2, as illustrated in the upper part and the middle part of FIG. 7, the CPU 61 drives the semiconductor pumping laser 41 in the third driving state Q3 for a third output time duration T3 [sec]. In the third driving state Q3, the semiconductor pumping laser 41 is supplied with a machining pumping current having a current value L2 [A] greater than the current value L1 [A] of the preliminary pumping current so as to emit the laser beam L having a laser output P1 [W] from the laser oscillator 21. Thus, as illustrated in the lower part of FIG. 7 and FIG. 8, after an irradiation position on which the laser beam L is irradiated on the machining surface WA of the workpiece W is moved from an initial position M0 to a start position of a line segment N1, the line segment N1 is marked is marked with the laser beam L having the laser output P1 [W] for the third output time duration T3 [sec].

Figure 8:
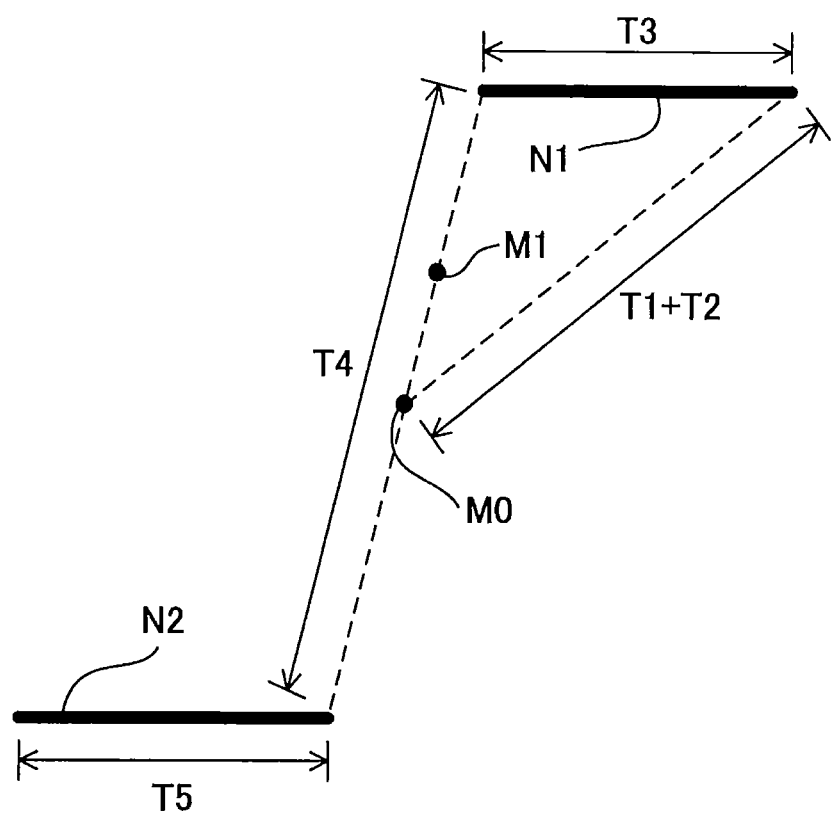
FIG. 8 is a schematic diagram illustrating an example of marking machining when the semiconductor pumping laser and the galvano scanner are driven according to the driving pattern and the output pattern of the galvano driving signal illustrated in FIG. 8.

Further, following the third driving state Q3, as illustrated in FIGS. 7 and 8, the CPU 61 drives the semiconductor pumping laser 41 in the fourth driving state Q4. In the fourth driving state Q4, the semiconductor pumping laser 41 is supplied with the preliminary pumping current having the current value L1 [A] again, and the irradiation position of the laser beam L on the machining surface WA of the workpiece W is moved toward a subsequent irradiation start position while the laser output of the laser oscillator 21 is maintained at zero [W]. Note that the subsequent irradiation start position is an irradiation position to be irradiated subsequent to the irradiation position irradiated when the machining is urgently stopped, and identified according to the X- and Y-coordinate data of the printing pattern read from the RAM 62.

Next, the description will be made about the driving pattern of the semiconductor pumping laser 41 for the marking machining from when the door 36 of the machining chamber 4 is opened while the preliminary pumping current having the current value L1 [A] is supplied to the semiconductor pumping laser 41 with reference to FIGS. 7 and 8.

As illustrated in the upper part of FIG. 7, the driving pattern of the semiconductor pumping laser 41 for the marking machining from when the door 36 of the machining chamber 4 is opened includes a fifth driving state Q5, a sixth driving state Q6, a seventh driving state Q7, and an eighth driving state Q8. More specifically, when it is detected that the door 36 of the machining chamber 4 is opened, the CPU 61 drives the semiconductor pumping laser 41 in the five driving state Q5. In the five driving state Q5, the semiconductor pumping laser 41 is not supplied with the pumping drive current and the pump light output is maintained at zero [W], so that the semiconductor pumping laser 41 is urgently stopped.

Further, as illustrated in the lower part of FIG. 7, the CPU 61 sets the machining signal for instructing to perform the machining with the laser beam L to "OFF" and outputs the same to the galvano controller 45. In response, the galvano controller 45 urgently stops driving the galvano X-axis motor 31 and the galvano Y-axis motor 32. Thus, the movement of the irradiation position of the laser beam L on the machining surface WA of the workpiece W is stopped at a door opening position M1, as illustrated in FIG. 8. Note that the door opening position M1 is an irradiation position of the laser beam L when the door 36 of the machining chamber 4 is opened and the marking machining is urgently stopped.

Subsequently, as illustrated in the upper part of FIG. 7, when it is detected that both the door 36 of the machining chamber 4 are closed, the CPU 61 drives the semiconductor pumping laser 41 in the sixth driving state Q6. In the sixth driving state Q6, the preliminary pumping current having the current value L1 [A] is supplied to the semiconductor pumping laser 41 again. As illustrated in the lower part of FIG. 7 and FIG. 8, the CPU 61 resets the machining signal for instructing to perform the machining with the laser beam L to "ON" and outputs the same to the galvano controller 45.

In response, the galvano controller 45 again starts to drive the galvano X-axis motor 31 and the galvano Y-axis motor 32 in accordance with the X- and Y-coordinate data of the printing pattern. The irradiation position of the laser beam L on the machining surface WA of the workpiece W is moved from the door opening position M1 toward the subsequent irradiation start position while the laser output of the laser oscillator 21 is maintained at zero [W].

As illustrated in the upper part and the middle part of FIG. 7, when a fourth output time duration T4 [sec] has passed since the fourth driving state Q4 was started and the irradiation position of the laser beam L has been arrived at the subsequent irradiation start position, the CPU 61 drives the semiconductor pumping laser 41 in the seventh driving state Q7 for a fifth output time duration T5 [sec]. In the seventh driving state Q7, the machining pumping current having the current value L2 [A] is supplied to the semiconductor pumping laser 41 so as to emit the laser beam L having the laser output P1 [W] from the laser oscillator 21. As illustrated in the lower part of FIG. 7 and FIG. 8, after the irradiation position of the laser beam L on the machining surface WA of the workpiece W is moved from the door opening position M1 toward a start position of a line segment N2, i.e., toward the subsequent irradiation start position, the line segment N2 is marked with the laser beam L having the laser output P1 [W] for the fifth output time duration T5 [sec].

Following the seventh driving state Q7, as illustrated in the upper part of FIG. 7, the CPU 61 drives the semiconductor pumping laser 41 in the eighth driving state Q8 for a sixth output time duration T6 [sec]. In the eighth driving state Q8, the pump light output is maintained at zero [W] without supplying the pumping drive current to the semiconductor pumping laser 41 and is stopped. After that, the CPU 61 drives the semiconductor pumping laser 41 in the standby state Q0 again. As illustrated in the lower part of FIG. 7, the CPU 61 sets the machining signal for instructing to perform the machining with the laser beam L to "OFF" and outputs the same to the galvano controller 45. In response, the galvano controller 45 stops driving the galvano X-axis motor 31 and the galvano Y-axis motor 32.

On the other hand, as illustrated in FIG. 6, if the determination is made that the irradiation flag is set to ON (S123: YES), the CPU 61 advances to S126. In S126 through S129 the CPU 61 performs the same processes as the processes of S20 through S23 illustrated in FIG. 4, and then ends the second control process.

As described above in detail, the laser machining device 81 according to the second embodiment can attain the same advantageous effects as that of the laser machining device 1 according to the first embodiment. Further, in the laser machining device 81 according to the second embodiment, the CPU 61 sets the machining flag to ON and the irradiation flag to OFF if the marking machining is performed but the pumping drive current supplied to the semiconductor pumping laser 41 is less than or equal to the "current threshold" corresponding to the maximum output value of the pump light which does not oscillate the pulsed laser (laser beam L) from the laser oscillator 21 at the timing when the door 36 of the machining chamber 4 is opened. Further, the CPU 61 urgently stops the semiconductor pumping laser 41 and the galvano scanner 19.

After then, the CPU 61 supplies the preliminary pumping current having the current value L1 [A] less than or equal to the "current threshold" to the semiconductor pumping laser 41 if the machining flag is set to ON and the irradiation flag is set to OFF at the timing when it is detected that both the doors 36 are closed. Subsequently, the CPU 61 supplies the machining pumping current having the current value L2 [A] to the semiconductor pumping laser 41 in accordance with the driving pattern of the semiconductor pumping laser 41 for the marking machining from when the door 36 of the machining chamber 4 is opened, and outputs, to the galvano controller 45, the "machining speed" and the X- and Y-coordinate data of the printing pattern for the marking machining from when the door 36 of the machining chamber 4 is opened.

Therefore, even if at least one of the doors 36 is opened during the machining and the urgent stop state occurs, the urgent stop state is automatically released when both the doors 36 are closed under the condition that the laser oscillator 21 does not emit the laser beam L at the timing when the door 36 of the machining chamber 4 is opened. Thus, the CPU 61 can continuously perform the projected marking machining to be performed after the door 36 of the machining chamber 4 is opened, thereby further reducing the machining time and improving the yield ratio of products.

Further, since the preliminary pumping current having the current value L1 [A] is supplied to the semiconductor pumping laser 41 when both the doors 36 are closed, the pump light which does not oscillate the pulsed laser is incident upon the laser oscillator 21 through the optical fiber F and the laser oscillator 21 transits to the low pumped state. As a result, if the machining pumping current having the current value L2 [A] is supplied to the semiconductor pumping laser 41 and the pump light for the machining is incident upon the laser oscillator 21, the laser oscillator 21 can emit the pulsed laser (laser beam L) in a short time, thereby improving the printing quality of characters, symbols, graphics, and the like marked onto the machining surface WA of the workpiece W.

Third Embodiment

Next, a laser machining device 91 according to a third embodiment will be described with reference to FIGS. 9 through 11. In the following description, like parts and components the same as or corresponding to the laser machining device 1 according to the first embodiment and the laser machining device 81 according to the second embodiment have been designated with the same reference numerals to avoid duplicating description.

An entire configuration of the laser machining device 91 according to the third embodiment is substantially the same as that of the laser machining device 81 according to the second embodiment. A control system and a control process of the laser machining device 91 according to the third embodiment is substantially the same as that of the laser machining device 81 according to the second embodiment.

The CPU 61 of the laser machining device 91 according to the third embodiment performs a "third control process" (see FIGS. 9 and 10) described later instead of the "second control process", which is different from the laser machining device 81 according to the second embodiment.

The third control process will be described with reference to FIGS. 9 through 11. The CPU 61 of the laser machining device 91 performs the third control process in which the marking machining is urgently stopped when the door 36 of the machining chamber 4 is opened and this urgent stop state is released. The program, according to which the third control process illustrated in the flowchart of FIGS. 9 and 10 is performed, is preliminarily stored in the ROM 63 and is repeatedly executed by the CPU 61 at specified time intervals, for example, at 100 msec intervals from the activation of the laser controller 5.

Figure 9:
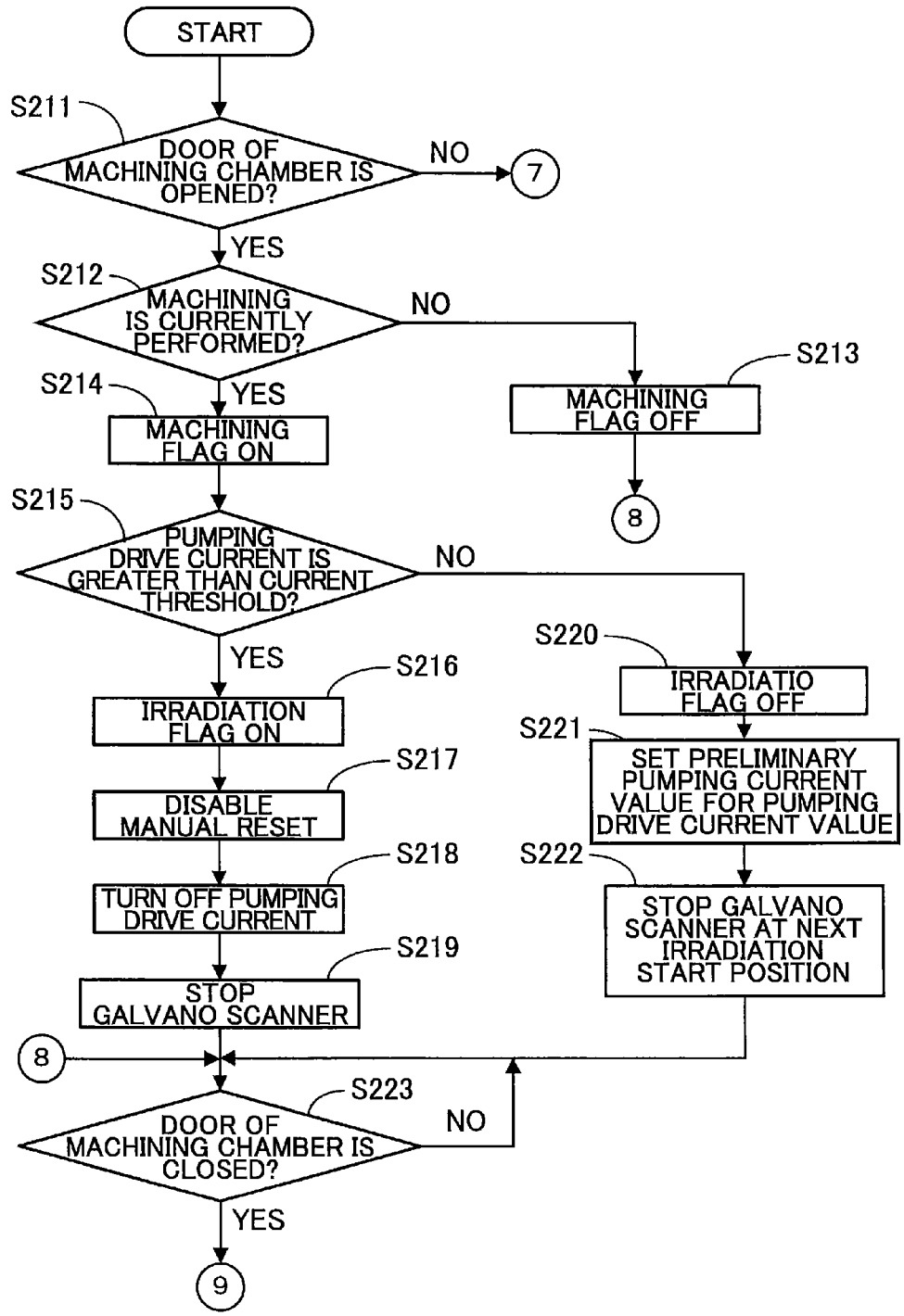
FIG. 9 is a first flowchart illustrating steps in a third control process executed by a CPU of the laser machining device according to a third embodiment.
Figure 10:
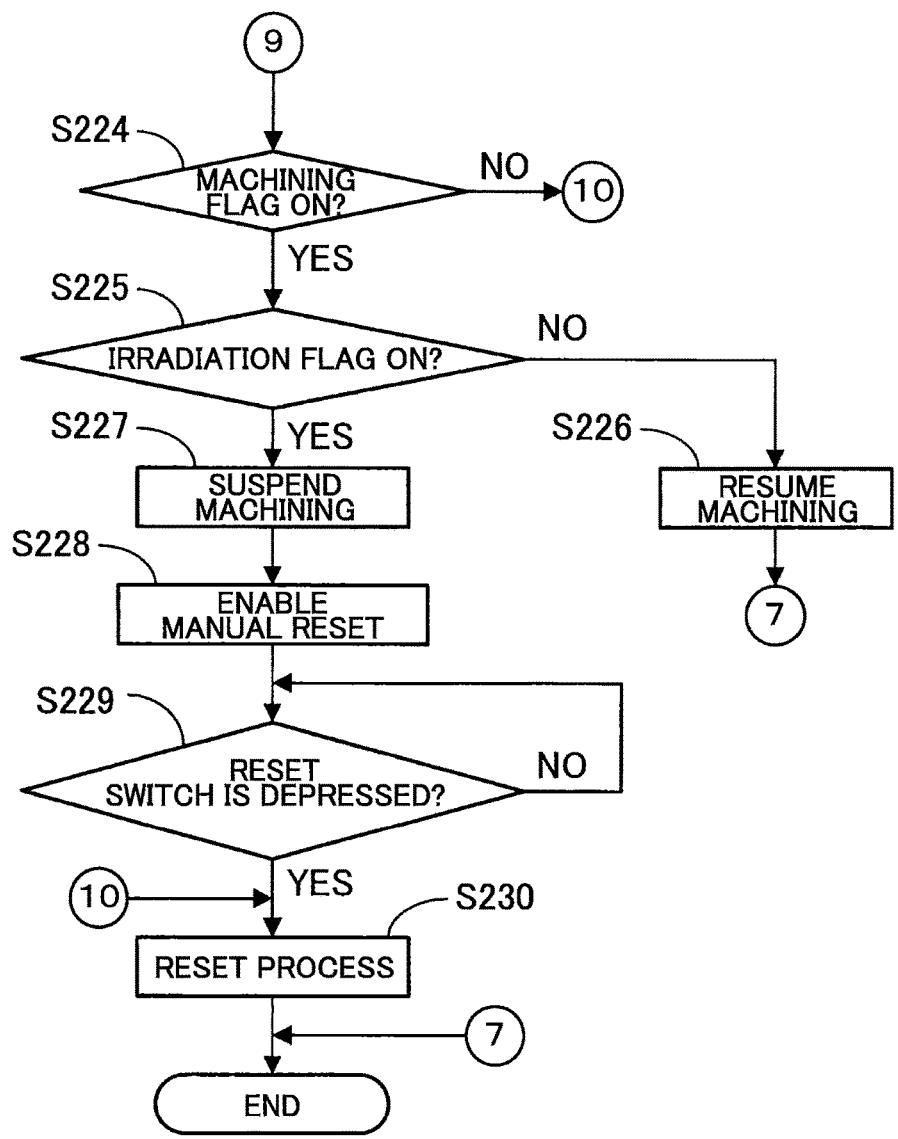
FIG. 10 is a second flowchart illustrating steps in the third control process executed by the CPU of the laser machining device according to the third embodiment.

As illustrated in FIGS. 9 and 10, in S111 and S112 the CPU 61 performs the same processes as the processes of S111 and S112 illustrated in FIG. 5. If the determination is made that the marking machining according to the printing data is not currently performed, i.e., the semiconductor pumping laser 41 is not supplied with the pumping drive current via the laser driver 42 (S212: NO), the CPU 61 advances to S213. In S213 the CPU 61 reads a machining flag from the RAM 62, sets the machining flag to OFF, re-stores it in the RAM 62. The CPU 61 then advances to S223 described later, and performs the same process as the process of S121 illustrated in FIG. 5. Note that the machining flag was set to OFF and stored in the RAM 62 when the laser controller 5 was activated.

On the other hand, if the determination is made that the marking machining is currently performed according to the printing data, i.e., the semiconductor pumping laser 41 is supplied with the pumping drive current via the laser driver 42 (S212: YES), the CPU 61 advances to S214. In S214 the CPU 61 reads the machining flag from the RAM 62, sets the machining flag to ON, and re-stores it in the RAM 62.

In S215 the CPU 61 performs the same process as the process of S115 illustrated in FIG. 5. If the determination is made that the current value of the pumping drive current supplied to the semiconductor pumping laser 41 via the laser driver 42 upon the instruction form the CPU 61 is greater than the "current threshold," i.e., the laser oscillator 21 emits the laser beam L (S215: YES), the CPU 61 advances to S216.

In S216 the CPU 61 reads an irradiation flag from the RAM 62, sets the irradiation flag to ON, and re-stores it in the RAM 62. The CPU 61 then advances to S217. In S217 through S219 the CPU 61 performs the same processes as the processes of S118 through S120 illustrated in FIG. 5. The CPU 61 then advances to S223, and performs the same process as the process of S121 illustrated in FIG. 5. Note that the irradiation flag was set to OFF and stored in the RAM 62 when the laser controller 5 was activated.

On the other hand, if the determination is made that the current value of the pumping drive current supplied to the semiconductor pumping laser 41 via the laser driver 42 upon the instruction from the CPU 61 is less than or equal to the "current threshold," i.e., the laser oscillator 21 does not emit the laser beam L (S215: NO), the CPU 61 advances to S220. In S220 the CPU 61 reads the irradiation flag from the RAM 62, sets the irradiation flag to OFF, and re-stores it in the RAM 62.

In S221 the CPU 61 instructs the laser driver 42 to supply, to the semiconductor pumping laser 41, the preliminary pumping current having the current value L1 [A] less than or equal to the "current threshold" as the current value of the pumping drive current corresponding to the maximum output value of the pump light which does not oscillate the pulsed laser (laser beam L) from the laser oscillator 21. That is, the CPU 61 maintains the supply of the preliminary pumping current having the current value L1 [A] to the semiconductor pumping laser 41. As a result, the pump light which does not oscillate the pulsed laser is incident upon the laser oscillator 21 through the optical fiber F. Thus, the laser oscillator 21 transits to the low pumped state where the laser oscillator 21 accumulates the optical energy inside the passive Q-switch but does not emit the laser beam L. The current value L1 [A] of the preliminary pumping current is preferably equal to or close to the "current threshold."

Data including "machining speed" and the X- and Y-coordinate data of the printing pattern for performing one machining process have been inputted via the PC 7 and stored in the RAM 62. In S222 the CPU 61 reads, from the RAM 62, the X- and Y-coordinate data of a subsequent irradiation start position and the "machining speed" for the marking machining from when the door 36 of the machining chamber 4 is opened, and outputs them to the galvano controller 45. Note that the machining speed means the marking speed by the laser beam L in the marking machining, and the printing pattern is generated according to the printing data representing a character, a symbol, a graphic, and the like. The subsequent irradiation start position is an irradiation position to be irradiated subsequent to the irradiation position irradiated when the machining is urgently stopped, and identified according to the X- and Y-coordinate data of the printing pattern read from the RAM 62.

The CPU 61 then outputs, to the galvano controller 45, the galvano scanner stop command data for instructing to stop the galvano X-axis motor 31 and the galvano Y-axis motor 32, and advances to S223. In response, the galvano controller 45 drives the galvano X-axis motor 31 and the galvano Y-axis motor 32 via the galvano driver 46 to set the irradiation position of the laser beam L to the subsequent irradiation start position, and urgently stops the galvano scanner 19.

Next, the description will be made about an example of the driving pattern of the semiconductor pumping laser 41 for the marking machining from when the door 36 of the machining chamber 4 is opened while the preliminary pumping current having the current value L1 [A] is supplied to the semiconductor pumping laser 41 with reference to FIG. 11. As illustrated in the upper part of FIG. 11, the driving pattern of the semiconductor pumping laser 41 for the marking machining from when the door 36 of the machining chamber 4 is opened includes a tenth driving state Q10 instead of the five driving state Q5 and the sixth driving state Q6 included in the driving pattern of the second embodiment illustrated in FIG. 7. More specifically, when it is detected that the door 36 of the machining chamber 4 is opened, the CPU 61 drives the semiconductor pumping laser 41 in the tenth driving state Q10. In the tenth driving state Q10, the preliminary pumping current having the current value L1 [A] is sustainably supplied to the semiconductor pumping laser 41. That is, the CPU 61 maintains the fourth driving state Q4 even after detecting that the door 36 of the machining chamber 4 is opened.

In addition, as illustrated in the lower part of FIG. 11, when it is detected that the door 36 of the machining chamber 4 is opened, the CPU 61 maintains the machining signal for instructing to perform the machining with the laser beam L at the "ON" state, reads the X- and Y-coordinate data for the subsequent irradiation start position of the laser beam L and the "machining speed" from the RAM 62, and outputs them to the galvano controller 45. In response, the galvano controller 45 drives the galvano X-axis motor 31 and the galvano Y-axis motor 32 to move the irradiation position of the laser beam L to the subsequent irradiation start position.

Subsequently, the CPU 61 sets the machining signal for instructing to perform the machining with the laser beam L to "OFF" and outputs it to the galvano controller 45. In response, the galvano controller 45 urgently stops the galvano X-axis motor 31 and the galvano Y axis-motor 32 and sets the irradiation position of the laser beam L to the subsequent irradiation start position.

As illustrated in FIGS. 9 and 10, in S223 through S225 the CPU 61 performs the same processes as the processes of S121 through S123 illustrated in FIGS. 5 and 6. If the determination is made that the irradiation flag is set to OFF (S225: NO), the CPU 61 advances to S226. Data including "machining speed," the X- and Y-coordinate data of the printing pattern, and the pumping drive current data for performing one machining process have been inputted via the PC 7 and stored in the RAM 62. In S226 the CPU 61 reads, from the RAM 62, the "machining speed," the X- and Y-coordinate data of the printing pattern, and the pumping drive current data for the marking machining from a subsequent irradiation start position. Note that the machining speed means the marking speed by the laser beam L in the marking machining, the printing pattern is generated according to the printing data representing a character, a symbol, a graphic, and the like, and the pumping drive current data represents the drive pattern of the semiconductor pumping laser 41.

The CPU 61 then supplies the pumping drive current to the semiconductor pumping laser 41 via the laser driver 42 in accordance with the driving pattern of the semiconductor pumping laser 41 from the subsequent irradiation start position of the laser beam L so that the pump light is emitted.

The CPU 61 also outputs, to the galvano controller 45, the "machining speed" and the X- and Y-coordinate data of the printing pattern from the subsequent irradiation start position of the laser beam L. As illustrated in the lower part of FIG. 11, the CPU 61 resets the machining signal for instructing to perform the machining with the laser beam L to "ON," outputs the same to the galvano controller 45, and then ends the third control process.

Thus, the galvano controller 45 starts to drive the galvano X-axis motor 31 and the galvano Y-axis motor 32 via the galvano driver 46 in accordance with the X- and Y-coordinate data of the printing pattern from the subsequent irradiation start position of the laser beam L. By scanning the laser beam L from the subsequent irradiation start position of the laser beam L two-dimensionally, the printing pattern such as a character, a symbol, a graphic, and the like are continuously marked onto the machining surface WA of the workpiece W.

The following description will be made about examples of the driving pattern of the semiconductor pumping laser 41 driven by the CPU 61 and the relationship between the corresponding operation of the galvano scanner 19 and the laser oscillator 21 when the door 36 of the machining chamber 4 is closed in S226 with reference to FIG. 11.

As illustrated in the upper part and the middle part of FIG. 11, the irradiation position of the laser beam L has already been moved to the subsequent irradiation start position by driving the galvano X-axis motor 31 and the galvano Y-axis motor 32 via the galvano driver 4 during the time after the door 36 of the machining chamber 4 is opened and before the door 36 of the machining chamber 4 is closed. Thus, when an eleventh output time duration T11 [sec] has passed since the fourth driving state Q4 was started and it has been detected that both the doors 36 of the machining chamber 4 are closed, the CPU 61 starts to supply the machining pumping current having the current value L2 [A] to the semiconductor pumping laser 41 so that the laser oscillator 21 outputs the laser beam L having the laser output P1 [W]. Accordingly, the eleventh output time duration T11 [sec] becomes shorter than the fourth output time duration T4 [sec] (see FIG. 7) by the driving time duration of the sixth driving state Q6 (see FIG. 7).

Subsequently, the CPU 61 drives the semiconductor pumping laser 41 in the seventh driving state for the fifth output time duration T5 [sec]. In the seventh driving state Q7, the machining pumping current having the current value L2 [A] is supplied to the semiconductor pumping laser 41. As illustrated in the lower part of FIG. 11, when it is detected that both the doors 36 of the machining chamber are closed, the CPU 61 resets the machining signal for instructing to perform the machining with the laser beam L to "ON" and outputs the same to the galvano controller 45. In response, the galvano controller 45 again starts to drive the galvano X-axis motor 31 and the galvano Y-axis motor 32 in accordance with the X- and Y-coordinate data of the printing pattern. Thus, as illustrated in the lower part of FIG. 11, the marking machining is performed with the laser beam L having the laser output P1 [W] for the fifth output time duration T5 [sec].

Following the seventh driving state Q7, as illustrated in the upper part of FIG. 11, the CPU 61 drives the semiconductor pumping laser 41 in the eighth driving state Q8 for the sixth output time duration T6 [sec]. In the eighth driving state Q8, the pump light output is maintained at zero [W] without supplying the pumping drive current to the semiconductor pumping laser 41 so as to stop the semiconductor pumping laser 41. After that, the CPU 61 resets the semiconductor pumping laser 41 to the standby state Q0. As illustrated in the lower part of FIG. 11, the CPU 61 sets the machining signal for instructing to perform the machining with the laser beam L to "OFF" and outputs the same to the galvano controller 45. In response, the galvano controller 45 stops driving the galvano X-axis motor 31 and the galvano Y-axis motor 32.

On the other hand, as illustrated in FIG. 10, if the determination is made that the irradiation flag is set to ON (S225: YES), the CPU 61 advances to S227. In S227 through S230 the CPU 61 performs the same processes as the processes of S126 through S129 illustrated in FIG. 6, and then ends the third control process.

As described above in detail, the laser machining device 91 according to the third embodiment can attain advantageous effects the same as that of the laser machining device 1 according to the first embodiment. Further, in the laser machining device 91 according to the third embodiment, the CPU 61 sets the machining flag to ON and the irradiation flag to OFF, if the machining is performed and the current value of the pumping drive current supplied to the semiconductor pumping laser 41 is less than or equal to the "current threshold" corresponding to the maximum output value of the pump light which does not oscillate the pulsed laser (laser beam L) from the laser oscillator 21 at the timing when the door 36 of the machining chamber 4 is opened.

Further, the CPU 61 supplies the preliminary pumping current L1 [A] less than or equal to the "current threshold" to the semiconductor pumping laser 41 via the laser driver 42. The CPU 61 also drives the galvano X-axis motor 31 and the galvano Y-axis motor 32 via the galvano controller 45 to set the irradiation position of the laser beam L to the subsequent irradiation start position, and urgently stops the galvano scanner 19.

Subsequently, the CPU 61 supplies the machining pumping current having the current value L2 [A] to the semiconductor pumping laser 41 in accordance with the driving pattern of the semiconductor pumping laser 41 from the subsequent irradiation start position of the laser beam L if the machining flag is set to ON and the irradiation flag is set to OFF at the timing when it is detected that both the doors 36 are closed. Simultaneously, the CPU 61 outputs, to the galvano controller 45, the "machining speed" and the X- and Y-coordinate data of the printing pattern from the subsequent irradiation start position of the laser beam L.

Therefore, even if at least one door 36 of the machining chamber 4 is opened and the urgent stop state occurs while the marking machining is performed, the urgent stop state is automatically released at the timing when both the doors 36 of the machining chamber 4 are closed under the condition that the laser oscillator 21 does not emit the laser beam L when the door 36 of the machining chamber 4 is opened. Thus, the CPU 61 can continuously perform the marking machining from the subsequent irradiation start position of the laser beam L subsequent to the irradiation position irradiated immediately before the machining is urgently stopped, thereby further reducing the machining time and improving the yield ratio of the products.

When the door 36 of the machining chamber 4 is opened during the marking machining is performed, the preliminary pumping current having the current value L1 [A] is supplied to the semiconductor pumping laser 41. Thus, the pump light which does not oscillate the pulsed laser is incident upon the laser oscillator 21 through the optical fiber F, and the laser oscillator 21 transits to the low pumped state. Therefore, if the machining pumping current having the current value L2 [A] is supplied to the semiconductor pumping laser 41 and the pump light for the machining is incident upon the laser oscillator 21, the laser oscillator 21 can emit the pulsed laser (laser beam L) in a short time, thereby improving the printing quality of characters, symbols, graphics, and the like marked onto the machining surface WA of the workpiece W.

While the description has been made in detail with reference to specific embodiments, it would be apparent to those skilled in the art that various changes and modifications may be made thereto. In the following description, like parts and components the same as or corresponding to the laser machining device 1 according to the first embodiment illustrated in FIGS. 1 through 8 have been designated with the same reference numerals to avoid duplicating description.

(B1) For example, in S115 of FIG. 5 and in S215 of FIG. 9, the CPU 61 may perform a determination process for determining whether the laser oscillator 21 emits the laser beam L via the optical sensor 18. That is, the CPU 61 may perform the determination process for determining whether the optical sensor 18 detects the emission intensity of the incident laser beam L.

If the CPU 61 determines that the laser oscillator 21 emits the laser beam L via the optical sensor 18 (S115: YES, S215: YES), the CPU 61 may advance to S116 or S216. On the other hand, if the CPU 61 determines that the laser oscillator 21 does not emit the laser beam L via the optical sensor 18 (S115: NO, S215: NO), the CPU 61 may advance to S117 or S220. As a result, the CPU 61 can reliably detect whether the laser oscillator 21 emits the laser beam L.

(B2) For example, in the laser machining device 91 according to the third embodiment, the CPU 61 may perform the process of S222 after performing the process of S220. The CPU 61 may perform the process of S217 and its following processes after performing the process of S222. In S225, if the CPU 61 determines that the irradiation flag is set to OFF (S225: NO), the CPU 61 may perform the processes of S124 and S125 instead of the process of S226.

As a result, the CPU 61 drives the galvano X-axis motor 31 and the galvano Y-axis motor 32 via the galvano controller 45 to set the irradiation position of the laser beam L to the subsequent irradiation start position, and urgently stops the galvano scanner 19. The CPU 61 drives to turn the relay 66 OFF to interrupt the driving current supplied to the laser driver 42 from the power supply unit 52. That is, the CPU 61 sets the pumping drive current supplied to the semiconductor pumping laser 41 to OFF to urgently stop the irradiation of the pump light, and sets the laser oscillator 21 so as not to emit the laser beam L.

Therefore, even if at least one door 36 of the machining chamber 4 is opened and the urgent stop state occurs during the marking machining is performed, the urgent stop state is automatically released at the timing when both the door 36 of the machining chamber 4 are closed under the condition that the laser oscillator 21 does not emit the laser beam L when the door 36 of the machining chamber 36 is opened. Thus, the CPU 61 can continuously perform the marking machining from the subsequent irradiation start position of the laser beam L instead of the irradiation position at the timing when the door 36 is opened, thereby further reducing the machining time and improving the yield ratio of the products.

Further, since the preliminary pumping current having the current value L1 [A] is supplied to the semiconductor pumping laser 41 when both the door 36 are closed, the pump light which does not oscillate the pulsed laser is incident upon the laser oscillator 21 through the optical fiber F, and the laser oscillator 21 transits to the low pumped state. Therefore, if the machining pumping current having the current value L2 [A] is supplied to the semiconductor pumping laser 41 and the pump light for the machining is incident upon the laser oscillator 21, the laser oscillator 21 can emit the pulsed laser (laser beam L) in a short time, thereby improving the printing quality of characters, symbols, and graphics marked onto the machining surface WA of the workpiece W.

(B3) For example, in the laser machining device 81 according to the second embodiment, the CPU 61 may advance to S118 after performing the process of S113 in order to reliably set the urgent stop state (from S118 to S120) even though the marking machining is not performed. Because the processes following S118 in FIGS. 5 and 6 are the same as the "second control process" performed by the CPU 61 of the laser machining device 81 according to the second embodiment, the control process after this modification is substantially the same as the second control process of the laser machining device 81 according to the second embodiment.

(B4) For example, in the laser machining device 91 according to the third embodiment, the CPU 61 may advance to S217 after performing the process of S213 in order to reliably set the urgent stop state (from S217 to S219) even though the marking machining is not performed. Because the processes following S217 in FIGS. 9 and 10 are the same as the "third control process" performed by the CPU 61 of the laser machining device 91 according to the third embodiment, the control process after this modification is substantially the same as the third control process of the laser machining device 91 according to the third embodiment.

(B5) For example, in the laser machining device 81 according to the second embodiment, in S119 the CPU 61 may instruct the laser driver 42 to supply, to the semiconductor pumping laser 41, the preliminary pumping current having the current value L1 [A] (bias current, for example) less than or equal to the "current threshold" as the current value of the pumping drive current corresponding to the maximum output value of the pump light which does not oscillate the pulsed laser (laser beam L) from the laser oscillator 21. That is, the CPU 61 may maintain the fourth driving state Q4 instead of the five driving state Q5 illustrated in FIG. 7.

Thus, the pump light which does not oscillate the pulsed laser is incident upon the laser oscillator 21 through the optical fiber F, and the laser oscillator 21 maintains its low pumped state. As a result, if the machining pumping current having the current value L2 [A] is supplied to the semiconductor pumping laser 41 and the pump light for the processing is incident upon the laser oscillator 21, the laser oscillator 21 can emit the pulsed laser (laser beam L) in a short time, thereby improving the printing quality of characters, symbols, graphics, and the like marked onti the machining surface WA of the workpiece W.

(B6) For example, in the laser machining device 81 according to the second embodiment, in S124 the CPU 61 may delay an instruction timing for instructing the laser driver 42 to supply, to the semiconductor pumping laser 41, the preliminary pumping current having the current value L1 [A] less than or equal to the "current threshold" which does not oscillate the pulsed laser (laser beam L) from the laser oscillator 21 until a timing just-in-time to allow the current value of the pumping drive current supplied to the semiconductor pumping laser 41 to rise to the current value L1 [A] of the preliminary pumping current, thereby achieving the power saving of the laser machining device 81.

(B7) Other laser beam emitting means may be employed, for example, high output semiconductor lasers, instead of the laser oscillator 21 and the semiconductor pumping laser 41. In this case, the laser beam emitted from the high output semiconductor laser can be directly irradiated onto the machining surface WA of the workpiece W, which reduces components and thus attains the miniaturization and weight saving of the device. The laser beam emitted from the laser beam emitting means is not limited to the pulsed laser. Continuous laser beam during the machining (emitting) may be employed, for example.

What is claimed is:

1. A laser machining device comprising:
    a laser head including: a laser emitter configured to emit a laser beam; and a scanner configured to scan the laser beam onto a workpiece, the laser emitter performing machining the workpiece by the laser beam in a machining state;
    a machining chamber supporting the laser head and having a door, the workpiece being disposed in the machining chamber;
    a detector configured to detect opening and closing of the door;
    a driver configured to drive the laser emitter and the scanner;
    an interface configured to receive a release command instructing to release a stop state of the laser emitter, the laser emitter being inhibited from emitting the laser beam in the stop state; and
    a controller configured to perform:
        (a) in the machining state, controlling the laser emitter and the scanner via the driver according to machining data;
        (b) in response to detecting the opening of the door, bringing the laser emitter into the stop state and disabling receipt of the release command via the interface;
        (c) in response to detecting the closing of the door while the laser emitter is in the stop state, determining whether the laser emitter is in the machining state when the opening of the door is detected;
        (d) in response to determining that the laser emitter is not in the machining state, releasing the stop state of the laser emitter;
        (e) in response to determining that the laser emitter is in the machining state, enabling the receipt of the release command via the interface; and
        (f) in response to receiving the release command via the interface, releasing the stop state of the laser emitter.

2. The laser machining device according to claim 1, wherein the controller is configured to further perform:
    (g) in response to determining that the laser emitter is in the machining state in the determining (c), determining whether the laser emitter is in a pumped state in which the laser emitter emits substantially no laser beam; and
    (h) in response to determining that the laser emitter is in the pumped state, releasing the stop state of the laser emitter.

3. The laser machining device according to claim 2, wherein the releasing (h) releases the stop state of the laser emitter after changing the laser emitter from the pumped state to a preliminary pumped state in which the laser emitter emits no laser beam.

4. The laser machining device according to claim 2, further comprising a memory;

wherein the controller is configured to further perform:
- (i) storing an irradiation position of the laser beam on the workpiece when the bringing (b) brings the laser emitter into the stop state; and
- (j) controlling the laser emitter and the scanner via the driver to resume emitting the laser beam from the irradiation position according to the machining data after the releasing (h) releases the stop state of the laser emitter.

5. The laser machining device according to claim 2, wherein the controller is configured to further perform:
- (k) in response to detecting the opening of the door, acquiring an irradiation position of the laser beam on the workpiece;
- (l) identifying a subsequent irradiation position to be irradiated subsequent to the irradiation position according to the machining data;
- (m) driving the scanner via the driver to irradiate the laser beam onto the subsequent irradiation position on the workpiece; and
- (n) bringing the laser emitter into the stop state after driving the scanner via the driver to irradiate the laser beam onto the subsequent irradiation position on the workpiece.

6. A method of controlling laser machining with a laser machining device including: a laser head that includes: a laser emitter configured to emit a laser beam; and a scanner configured to scan the laser beam onto a workpiece, the laser emitter performing machining the workpiece by the laser beam in a machining state; a machining chamber supporting the laser head and having a door, the workpiece being disposed in the machining chamber; a detector configured to detect opening and closing of the door; a driver configured to drive the laser emitter and the scanner; and an interface configured to receive a release command instructing to release a stop state of the laser emitter, the laser emitter being inhibited from emitting the laser beam in the stop state, the method comprising:
- (a) in the machining state, controlling the laser emitter and the scanner via the driver according to machining data;
- (b) in response to detecting the opening of the door, bringing the laser emitter into the stop state and disabling receipt of the release command via the interface;
- (c) in response to detecting the closing of the door while the laser emitter is in the stop state, determining whether the laser emitter is in the machining state when the opening of the door is detected;
- (d) in response to determining that the laser emitter is not in the machining state, releasing the stop state of the laser emitter;
- (e) in response to determining that the laser emitter is in the machining state, enabling the receipt of the release command via the interface; and
- (f) in response to receiving the release command via the interface, releasing the stop state of the laser emitter.

* * * * *